Georges Attali
INVENTOR

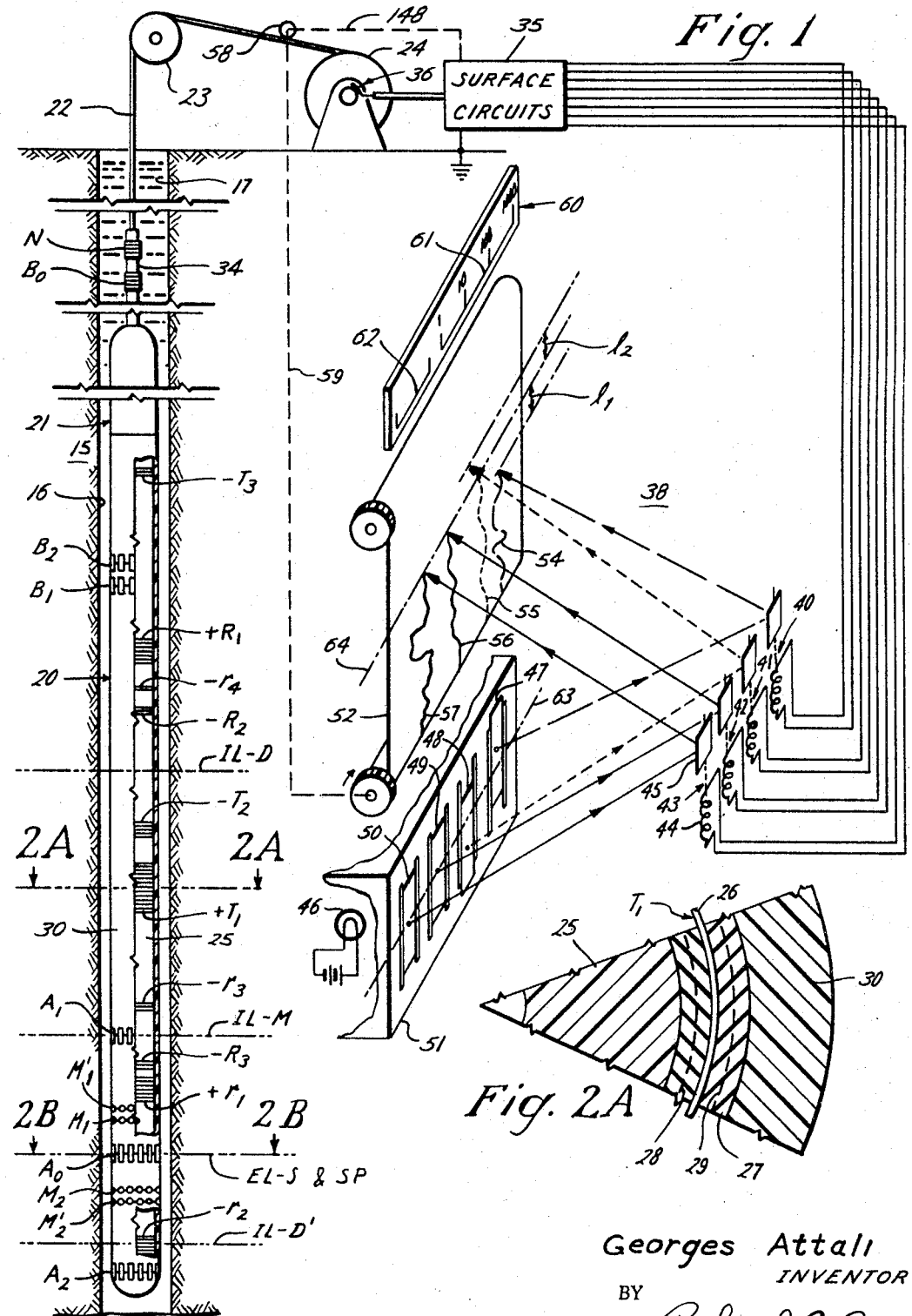

Georges Attali
INVENTOR

Georges Attali
INVENTOR

United States Patent Office 3,453,530
Patented July 1, 1969

3,453,530
METHODS AND APPARATUS FOR INVESTIGATING EARTH FORMATIONS INCLUDING MEASURING THE RESISTIVITY OF RADIALLY DIFFERENT FORMATION ZONES
Georges Attali, Ridgefield, Conn., assignor, by mesne assignments, to Schlumberger Technology Corporation, Houston, Tex., a corporation of Texas
Continuation of application Ser. No. 240,568, Nov. 28, 1962. This application Mar. 1, 1968, Ser. No. 709,838
Int. Cl. G01v *3/18*
U.S. Cl. 324—1       34 Claims

ABSTRACT OF THE DISCLOSURE

In accordance with an illustrative embodiment of the present invention, a shallow depth of investigation electrode system, one of whose electrodes is also used to measure spontaneous potential, is carried on the same support member with medium and deep investigation focused coil systems to produce simultaneous resistivity measurements of three radially different formation zones. Apparatus is disclosed for accomplishing this without any substantial interference between the various exploring devices. The resistivity measurements are then converted to logarithmic functions thereof for recording on the same portion of a common recording medium and the spontaneous potential measurement is recorded on a different portion of the recording medium.

---

This invention relates to methods and apparatus for investigating subsurface earth formations traversed by a borehole and, particularly, to such methods and apparatus which measure the electrical properties of the subsurface earth material adjacent the borehole.

This application is a continuation of applicant's copending application Ser. No. 240,568 filed Nov. 28, 1962, for "Methods and Apparatus for Investigating Earth Formations," now abandoned.

In the quest for oil, gas and other forms of hydrocarbons located below the surface of the earth, it is known that the mere drilling of a borehole into the earth usually does not provide sufficient information concerning the existence, depth, quantity, producibility, etc. of such hydrocarbons. Consequently, various so-called electrical logging methods have been developed for providing this information. These methods make use of some form of electrical exploring device or sensing system which is moved through the borehole and which operates to measure an electrical characteristic of the adjacent formation material during the course of such movement. A typical characteristic which is frequently measured is the electrical resistance of the formation material. In theory, the electrical resistance should be relatively high when the formation pore spaces contain a high percentage of hydrocarbons because hydrocarbons are relatively poor conductors of electricity. When such hydrocarbons are not present, on the other hand, the pore spaces will be filled with connate formation water. In the majority of cases, such formation water is a relatively good conductor of electricity and, hence, a formation which is saturated with such formation water should have a relatively low value of electrical resistance.

In practice, both the making and the interpretation of the electrical measurements do not turn out to be such a simple matter. In the first place, the electrical resistance which is measured is dependent on the amount of the formation pore space, commonly referred to as the formation "porosity," as well as the nature of the fluid contained in this pore space. Consequently, two different formations containing the same kind of fluid but having different porosities will have different resistance values.

Another factor which renders the interpretation of the measurements more difficult is the common practice of filling the borehole with a drilling fluid or drilling mud during the drilling operation. As a result, some of this drilling mud will flow or penetrate laterally into any of the subsurface formations which are of a permeable nature. During the course of this lateral invasion, the larger solid particles contained in the drilling mud deposit themselves on the wall of the borehole in the form of a mudcake. At the same time, the residue or mud filtrate which actually invades the formation displaces a large portion, if not all, of the formation fluids which were originally present. The extent of this lateral invasion varies from formation to formation. Sometimes it is only a few inches, sometimes it is many tens of inches. These permeable formations, however, are of particular interest because the hydrocarbons which are readily capable of being brought up to the surface of the earth are found in such permeable formations.

The existence of mud filtrate invasion into the virgin formation material, the existence of a mudcake on the borehole wall, and the fact that the measurement is made by a device located in a borehole which is filled with a column of drilling mud which is frequently of a relatively conductive nature all affect the electrical measurement which is made. In general, any electrical measurement made in a borehole is dependent to a greater or lesser degree on the diameter of the borehole, the electrical resistance of the drilling mud, the thickness and electrical resistance of the mudcake, the extent of lateral mud filtrate invasion, the electrical resistance of the mud filtrate, the physical porosity of the formation, and the nature and electrical resistance of the fluid originally contained in the formation. Also, when relatively thin formations are encountered, more than one type of formation may enter into the measurement being made at any given moment. This same problem is also encountered at the boundary between two different formations.

Because of the foregoing considerations, a relatively large number of different types of electrical exploring devices or measuring systems have been heretofore proposed for measuring the electrical resistance (either resistivity or conductivity) of subsurface earth formations. One type of such measuring or logging system uses metal electrodes for emitting electrical current directly into the earth formations and for detecting voltages resulting from such current flow. Another type of logging system employs induction coils for electromagnetically inducing current flow in the earth formations and for detecting the secondary electromagnetic fields produced by such current flow. Many different forms of construction have been proposed for both types of systems, the different forms having different investigation patterns which are affected in different ways by the various subsurface parameters. Some are so-called focussed systems, while others are unfocussed systems. Each has its own advantage and limitations.

It has been heretofore proposed to overcome the limitations of any one type of exploring device or system by making multiple measurements with two or more different types of devices or systems. This results in a record or log having recorded thereon two or more curves, depending on the number of measurements which are made. The multiple measurements which have been heretofore proposed, however, suffer from at least two drawbacks. One is that their interpretation is relatively tedious and difficult. This leads to mistakes and errors in interpretation. Another drawback is that the multiple measurements heretofore proposed have frequently fallen short of the desirable objective of providing accurate indications of the nature and relative amounts of the various fluids originally present in the subsurface formations.

Another problem, which is equally as difficult as the problem of interpretation, is the problem of constructing the apparatus for performing the multiple measurements. The economics of the situation indicate that the measurements should be made in as few trips through the borehole as is possible. Consequently, the different exploring systems should all be located on a single piece of borehole apparatus. This, however, is not very easy to accomplish. The narrow confines of the bore hole considerably restrict the size of the apparatus. The possibility of undesired interaction between the different systems also imposes a severe limitation as to the number and types of systems which can be incorporated together or on a single piece of apparatus. This is particularly true of the so-called focussed systems because any individual focussed system is, in itself, a relatively complex structure.

It is an object of the invention, therefore to provide new and improved methods of investigating subsurface earth formations traversed by a borehole.

It is another object of the invention to provide new and improved borehole investigating methods which provide indications of the electrical characteristics of the subsurface formations which are easier and quicker to interpret.

It is a further object of the invention to provide new and improved borehole investigating methods which enable a more accurate determination of the nature and relative amounts of the various fluids originally contained in the subsurface earth formations.

It is an additional object of the invention to provide new and improved borehole investigating methods which provide a more accurate overall picture of the nature and conditions of the subsurface earth formations.

It is yet another object of the invention to provide new and improved borehole investigating methods which give a more accurate indication of the extent of any lateral invasion of drilling fluids into the subsurface formations.

It is a further object of the invention to provide new and improved borehole investigating apparatus which enables multiple measurements to be obtained on a single trip through the borehole with a minimum of adverse interaction between the measuring systems.

It is another object of the invention to provide new and improved borehole investigating apparatus for making multiple borehole measurements and for presenting the results of these measurements in a manner which is more readily and easily interpreted.

It is a further object of the invention to provide new and improved borehole investigating apparatus which combines a plurality of focussed-type exploring systems into a single piece of apparatus with a minimum of adverse interaction between the different systems.

It is an additional object of the invention to provide new and improved borehole investigating apparatus for enabling multiple induction type measurements to be made on a single trip through the borehole.

It is another object of the invention to provide new an improved focussed electrode-type borehole investigating apparatus having reduced signal gain requirements in its operating circuits and having improved stability therein.

It is an additional object of the invention to provide a new and improved method for converting measurements of one type to measurements of a type which are the reciprocal thereof.

In accordance with one feature of the invention, a method of obtaining an improved indication of the nature of subsurface earth formations traversed by a borehole comprises the step of measuring the electrical resistance of the formation material at a first lateral distance from the borehole by means of a shallow-penetration electrode system. The method also comprises measuring the electrical resistance of the formation material at a second lateral distance from the borehole by means of a first focussed coil system which is predominantly responsive to formation material at this second lateral distance. The method further includes the step of measuring the electrical resistance of the formation material at a third lateral distance from the borehole by means of a second focussed coil system which is predominantly responsive to formation material at this third lateral distance. The method also comprises recording these measurements on a common recording medium as a function of borehole depth.

In accordance with another feature of the invention, apparatus is provided whereby these various electrode and coil systems are combined as a single piece of apparatus. Consequently, the various measurements may be made in a simultaneous manner as the single piece of apparatus is moved through the borehole. In accordance with a further feature of the invention, the various signals obtained with the various measuring systems are converted into signals which are proportional to the logarithms thereof. These logarithmic signals are then recorded on a common recording medium as a function of borehole depth. In accordance with additional features of the invention, electrode systems and coil systems having improved operating characteristics are provided.

For a better understanding of the present invention, together with other and further objects and features thereof, reference is had to the following description taken in connection with the accompanying drawings, the scope of the invention being pointed out in the appended claims.

Referring to the drawings:

FIG. 1 illustrates in a schematic and partly cross-sectional manner, the general features of a representative embodiment of borehole investigating apparatus constructed in accordance with the present invention;

FIGS. 2A and 2B are cross-sectional views of portions of FIG. 1 apparatus taken along the section lines 2A—2A and 2B—2B thereof;

Figure 5A:
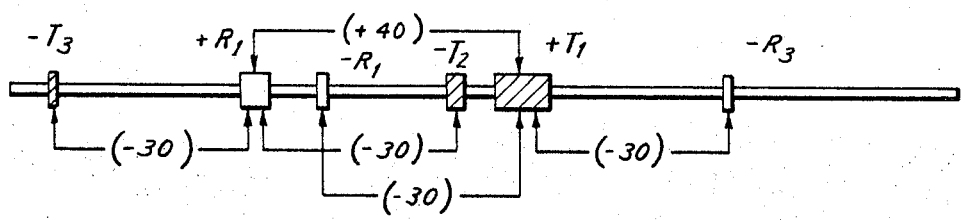
FIGS. 5A and 5B illustrate in a separate manner the different coil systems of the FIG. 1 apparatus and are used in explaining the operation of such coil systems.

Referring to FIG. 1 of the drawings, there is shown a representative embodiment of apparatus constructed in accordance with the present invention for investigating subsurface earth formations 15 traversed by a borehole 16. Borehole 16 is filled with a conductive drilling fluid or drilling mud 17. The borehole or downhole portion of the investigating apparatus includes an elongated cylindrical support member or housing member 20 to which are secured the sensing elements of the various exploring systems. Secured to the upper end of the support member 20 is an elongated cylindrical fluid-tight housing 21. Housing 21 contains various electrical circuits used in the operation of the sensing elements mounted on support member 20. The downhole apparatus, including the support member 20 and the fluid-tight housing 21, are suspended from the surface of the earth by means of an armored multi-conductor cable 22. At the surface, this cable 22 passes over a pulley 23 and to a drum and winch mechanism 24. Operation of the drum and winch mechanism 24 serves to move the downhole portion of the apparatus through the borehole 16.

The various exploring devices or exploring systems which are secured to the support member 20 include a first focussed coil system for measuring the electrical resistance of the formation material at a medium lateral distance (horizontal distance in the case of a truly vertical borehole) from the center of the borehole 16. This coil system is referred to as the IL–M system (Induction Log—Medium). This IL–M coil system includes a plurality of transmitter coils $T_1$, $T_2$ and $T_3$ and a plurality of receiver coils $R_1$, $R_2$, $R_3$ and $R_4$. These coils are of the cylindrical solenoid type and are comprised of one or more turns of insulated conductor wire which is wound around a cylindrical center mandrel 25 which forms the core of the support member 20.

The precise manner of construction of the coils is indicated in greater detail in the cross-sectional view of FIG. 2A, which is taken through the center of the transmitter coil $T_1$. As there indicated, the coil $T_1$, which is represented by a turn of conductor wire 26, is embedded in a layer of rubber material 27 which encircles the center mandrel 25. Also embedded in the rubber material 27 is an inner electrostatic shield 28 and an outer electrostatic shield 29. This entire assembly, including the center mandrel 25 and the rubber material 27, is enclosed by an outer sleeve member 30. As seen in FIG. 1, this outer sleeve member 30 is an elongated sleeve member of cylindrical shape which extends the entire length of the support member 20. (Part of the sleeve member 30 is broken away in the FIG. 1 view for purposes of showing the coils located therebelow.) Both the center mandrel 25 and the outer sleeve member 30 are constructed of a tough plastic material composed of a laminated Fiberglas cloth material impregnated with epoxy resin.

The exploring systems mounted on the support member 20 also include a second focused coil system for measuring the electrical resistance of the formation material at a deep lateral distance from the center of the borehole 16. This second coil system is designated as an IL–D system (Induction Log—Deep). It includes a plurality of transmitter coils $T_1$, $T_2$ and $T_3$ and a plurality of receiver coils $R_1$, $R_2$ and $R_3$. Each of these coils is of the solenoid type and comprises one or more turns of conductor wire which is wound around the center mandrel 25. The precise manner of construction is the same as that previously indicated for transmitter coil $T_1$.

It is noted that the transmitter coils $T_1$, $T_2$ and $T_3$ for the second coil system are the same transmitter coils which constituted part of the first coil system. Thus, a common set of transmitter coils is used for both the IL–M and the IL–D coil systems.

The various exploring systems included on the support member 20 further include a focused shallow-penetration electrode system for measuring the electrical resistance of the formation material at a relatively shallow lateral distance from the center of the borehole 16. This electrode system is designated as an EL–S system (Electrode Log—Shallow). It is located toward the lower end of the support member 20 and includes a survey current electrode $A_0$ and upper and lower focusing current electrodes $A_1$ and $A_2$, respectively. It also includes a first pair of voltage monitoring electrodes $M_1$ and $M_1'$ located between the $A_0$ survey current electrode and the upper $A_1$ focusing current electrode. It further includes a second pair of voltage monitoring electrodes $M_2$ and $M_2'$ located intermediate the $A_0$ survey current electrode and the lower $A_2$ focussing current electrode. Each of these electrodes is secured to the exterior of the sleeve member 30. The $A_0$, $A_1$ and $A_2$ electrodes individually comprise a series of small rectangular metal plates which are positioned to encircle the circumference of the sleeve member 30. The rectangular plates of each electrode are connected together by means of a closed loop of conductor wire which encircles the sleeve member 30 immediately below the rectangular plates.

Figure 2B:
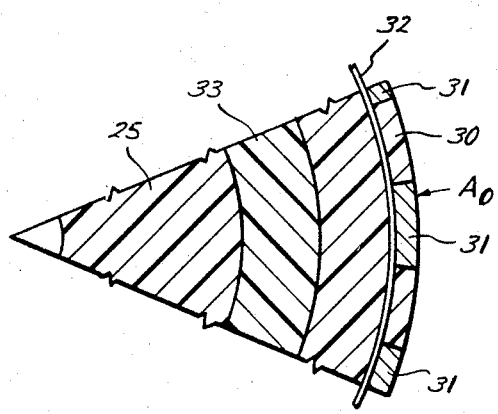

This manner of construction is indicated in greater detail for the case of the $A_0$ electrode in the cross-sectional view of FIG. 2B. In FIG. 2B, the small rectangular elements are represented by elements 31. The closed loop of conductor wire is represented by conductor wire 32. The plates 31 and conductor wire 32 are embedded in the outer surface of the sleeve member 30 with the outer faces of the plates 31 being exposed to the external environment. Since no induction coils are located beneath the $A_0$ electrode, the space between the center mandrel 25 and the outer sleeve member 30 is occupied by a plastic spacer member 33.

The voltage monitoring electrodes $M_1$, $M_1'$, $M_2$ and $M_2'$ are constructed in a similar manner except that small metal discs or buttons are used in place of the rectangular plates.

Additional information on the construction of the electrodes is given in co-pending application Ser. No. 743,604, filed in the name of William P. Schneider on June 23, 1958, now U.S. Patent No. 3,124,742, granted Mar. 10, 1964.

The electrode system also includes a pair of relatively close or electrically proximate current return electrodes $B_1$ and $B_2$ mounted toward the upper end of the support member 20. The $B_1$ electrode is the current return electrode for the $A_1$ focussing current electrode while the $B_2$ electrode is the current return electrode for the $A_2$ focussing current electrode. These $B_1$ and $B_2$ electrodes are constructed and secured to the exterior of the sleeve member 30 in the manner previously indicated for the other electrodes. The electrode system further includes a pair of relatively far removed or electrically remote electrodes $B_0$ and N. These remote electrodes are secured to the exterior of a layer of electrical insulation material 34 which surrounds the lower end of the armored cable 22. The $B_0$ electrode is a current return electrode for the $A_0$ survey current electrode while the N electrode is a remote voltage reference electrode which is used in connection with the voltage monitoring electrodes $M_1$, $M_1'$, $M_2$ and $M_2'$.

The various exploring systems mounted on the support member 20 also include means for measuring the naturally-occurring spontaneous earth potential existing in the fluid filled borehole 16. This spontaneous potential system is designated as an SP system. The means used to detect the spontaneous potential includes the $A_0$ survey current electrode of the EL–S electrode system.

The various electrical signals developed by the various downhole exploring systems are transmitted by way of the insulated conductors contained within the armored cable 22 to various surface circuits 35 located at the surface of the earth. Electrical connections between the cable conductors and the surface circuits 35 are made by way of an appropriate brush and slip ring assembly 36 associated with the drum and winch mechanism 24. These signals are processed by the surface circuits 35 in a manner to be considered hereinafter and then supplied to a photographic recorder 38 which is also located at the surface of the earth.

The photographic recorder 38 includes a plurality of mirror-type recording galvanometers 40, 41, 42 and 43 mounted in a side-by-side manner in a suitable galvanometer mounting block (not shown). The galvanometer 43, for example, includes a rotatable deflection coil 44 and a light reflecting mirror 45 mechanically secured thereto. The deflection coil 44 is located in a uniform magnetic flux field provided by a permanent magnet assembly included in the galvanometer mounting block (not shown). Consequently, any current flow through the coil 44 serves to cause angular rotation thereof and hence angular rotation of the mirror 45. The other galvanometers are of similar construction.

The recorder 38 also includes an individual adjustable light source for each of the galvanometers 40–43. These individual light sources are provided by an electric lamp 46 operating in conjunction with a plurality of adjustable aperture plates 47–50 which are slidably mounted on a suitable frame member 51. A small center aperture or passageway in each of the otherwise opaque aperture plates 47–50 constitutes a point source of light for one of the galvanometers 40–43. The resulting light beams provided by these point sources are reflected by the galvanometer mirrors onto a common photosensitive recording medium 52. Suitable optical lenses (not shown) are provided for providing the necessary focusing action. The recording medium 52 is an appropriate photographic film material coated with a suitable photosensitive emulsion.

The recording medium 52 is moved or advanced in synchronism with the movement of the downhole apparatus through the borehole 16 so that the various light beams are effective to produce continuous traces on the recording medium 52 as a function of borehole depth. Thus, the light beam of galvanometer 40 produces a trace 54, the light beam of galvanometer 41 a trace 55, the light beam of galvanometer 42 a trace 56 and the light beam of galvanometer 43 a trace 57. (These traces are, of course, not visible to the naked eye until the photographic film has been developed.) Movement of the recording medium 52 is synchronism with the downhole portion of the apparatus is provided by a mechanical measuring wheel 58 which engages the armored cable 22 and is rotated by the movement of such cable across the rim thereof. This measuring wheel 58 is coupled by a suitable linkage mechanism indicated schematically by dash line 59 to the roller mechanism associated with the recording medium 52.

The angular rotation of each of the galvanometers 40–43 is effective to deflect the corresponding light beam across the recording medium 52 in a direction at right angles to the direction of advancement of the recording medium 52. For the particular representation of FIG. 1, the recording medium advances in a vertical direction and the light beams are deflected in a horizontal direction. The recording medium 52 is provided with a scale calibration 60 which serves to calibrate the horizontal deflections of the galvanometer light beams. In this regard, the recording medium 52 is considered as being vertically divided into a pair of side-by-side portions as indicated by the two portions 61 and 62 of the scale calibration 60. Galvanometers 40, 41 and 42 are mechanically constructed so that their deflections can only produce traces on the first portion 61, while the galvanometer 43 is constructed to produce a trace only on the second portion 62.

The adjustable nature of the aperture plates 47–50 enables adjustment of the vertical positions of the light beams on the recording medium 52. This feature is used to take into account the different vertical locations of the measuring points for the different exploring systems mounted on the downhole apparatus. Reference lines 63 and 64 represent corresponding horizontal reference lines for the aperture plates 47–50 and the recorder traces 54–57, respectively. Thus, if the center aperture in each of the aperture plates 47–50 is located on the reference line 63, then each of the light beams will strike the recording medium 52 on the reference line 64. Appropriate adjustment of the vertical positions of the center apertures in the aperture plates 47–50 will cause corresponding displacements of the light beams above or below the reference line 64 on the recording medium 52.

Figure 3:
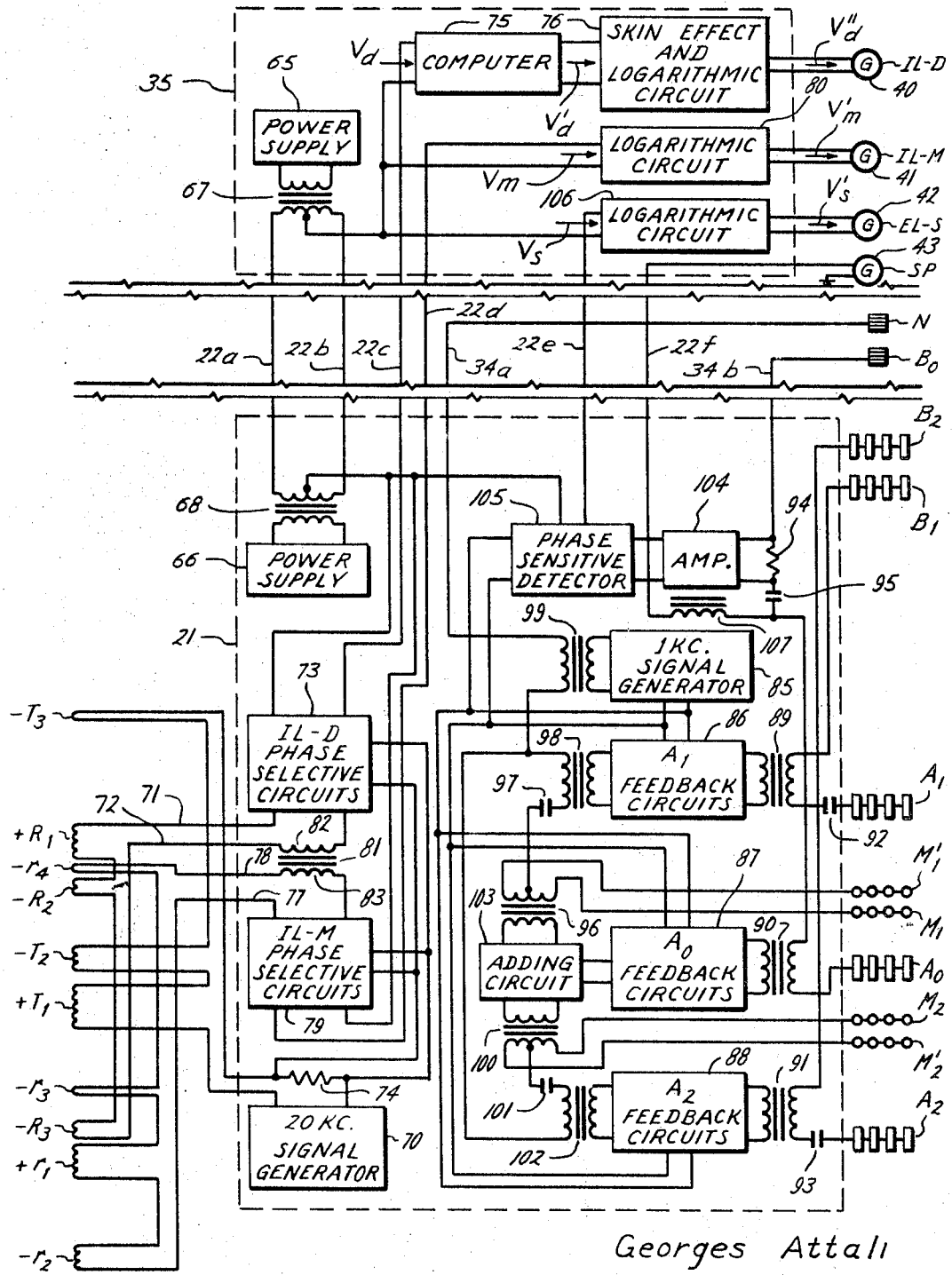
FIG. 3 is a schematic circuit diagram showing a representative embodiment of electrical circuits for use with the apparatus of FIG. 1.

Referring now to FIG. 3 of the drawings, there is shown in a schematic manner the various electrical circuits which are used in the investigating apparatus of FIG. 1. The circuits contained within the dash-line box 21 of FIG. 3 are the circuits which are contained in the fluid-tight housing 21 of the downhole apparatus of FIG. 1. The circuits contained within the dash-line box 35 of FIG. 3 are the circuits which are located at the surface of the earth. In FIG. 3, the galvanometers 40–43 are represented in a schematic manner, it being understood that their actual construction and cooperation with the remainder of the photographic recorder 38 is as indicated in FIG 1.

Electrical power for operating the downhole circuits is provided by a power supply unit 65 located at the surface of the earth. This surface power supply 65 is connected to a downhole power supply 66 by way of a transformer 67, a pair of conductors 22a and 22b contained within the armored cable 22 and a downhole transformer 68. The power supply connections between the downhole power supply 66 and the other downhole circuits is omitted for sake of simplicity.

The downhole circuits of FIG. 3 include a first signal generator 70 for supplying energizing current to the transmitter coils $T_1$, $T_2$ and $T_3$. This energizing current is an alternating current of a constant predetermined frequency such as 20 kilocycles per second, and is of constant peak amplitude. The connections between the signal generator 70 and the transmitter coils is such that these transmitter coils are connected in series with one another with the transmitter coils $T_2$ and $T_3$ being connected in a series-opposing manner with respect to the transmitter coil $T_1$. Transmitter coil $T_1$ is provided with a greater number of turns than any other of the transmitter coils and, hence, is considered as the main or primary transmitter coil. The polarity of $T_1$ is arbitrarily defined as being positive, in which case the polarities of $T_2$ and $T_3$ are negative.

The receiver coils $R_1$, $R_2$ and $R_3$ of the IL–D coil system are interconnected in a series manner with the coils $R_2$ and $R_3$ being connected in a series-opposing manner with respect to the coil $R_1$. Receiver coil $R_1$ has a greater number of turns than the other receiver coils and, hence, is considered as the main or primary receiver coil. Its polarity is assumed to be positive, in which case the other coils $R_2$ and $R_3$ are of negative polarity.

The interconnected receiver coils $R_1$, $R_2$ and $R_3$ are connected by way of a pair of conductors 71 and 72 to a first pair of input terminals of phase selective circuits 73. An alternating current phase reference signal having the same phase as the transmitter coil energizing current is developed across a resistor 74 of small resistance value connected in series with the supply circuit leads to the transmitter coils. The phase reference signal is supplied to a second pair of input terminals of the phase selective circuits 73. Under the control of this phase reference signal, the phase selective circuits 73 operate to develop a unidirectional or direct-current output signal which is proportional in magnitude to the magnitude of the component of the net receiver coil signal which is "in phase" with this phase reference signal. An "in phase" relationship is considered as including both a zero degree and a 180° phase relationship since both lie along the same phase axis.

The unidirectional signal appearing at the output terminals of phase selective circuits 73 is transmitted by way of a cable conductor 22c to a computer 75 located at the surface of the earth. A phantom signal return path is provided by power supply transformers 67 and 68 and cable conductors 22a and 22b. The computer signal appearing at the output of computer 75 is supplied to a skin effect and logarithmic circuit 76. The resulting skin effect corrected logarithmic signal appearing at the output of circuit 76 is then supplied to the galvanometer 40 to provide the recorder trace for the IL–D coil system.

The receiver coils $r_1$, $r_2$, $r_3$ and $r_4$ for the IL–M coil system are connected in series with one another with the $r_2$, $r_3$ and $r_4$ coils being connected in a series-opposed manner with respect to the $r_1$ coil. The $r_1$ coil has a greater number of turns than any other of these IL–M receiver coils and, hence, is designated as the main or primary IL–M receiver coil. Its polarity is assumed to be positive, in which case the polarities of the $r_2$, $r_3$ and $r_4$ coils negative. The interconnected $r_1$–$r_4$ receiver coils are connected by a pair of conductors 77 and 78 to a first pair of input terminals of a second set of phase selective circuits 79. The phase reference signal developed across resistor 74 is also supplied to a second pair of input terminals of these phase selective circuits 79. The resulting unidirectional or direct-current signal at the output terminals of phase selective circuit 79 is proportional in magnitude to the magnitude of the component of the net signal provided by receiver coils $r_1$–$r_4$ which is in phase with this phase reference signal.

This unidirectional output signal is then transmitted by way of a cable conductor 22d to a logarithmic circuit 80 located at the surface of the earth. The resulting logarithmic signal at the output of logarithmic circuit 80 is then supplied to the galvanometer 41 to produce the recorder trace for the IL–M coil system on the recording medium 52.

In order to compensate for mutual coupling between the two sets of receiver coils, mutual impedance means in the form of a coupling transformer 81 is coupled between the output circuits for the two sets of receiver coils. More particularly, a first winding 82 of the coupling transformer 81 is connected in series with the conductor 72 for the IL–D receiver coils, while a second winding 83 is connected in series with the conductor 78 associated with the IL–M set of receiver coils. The coupling transformer 81 is constructed so that the mutual coupling between the two windings 82 and 83 thereof is equal in magnitude to the mutual coupling between the two sets of receiver coils. The windings 82 and 83 are, however, connected with the appropriate polarity so that in each circuit this mutual coupling is of opposite polarity to the mutual coupling between the two sets of receiver coils. In this manner, any voltage induced in one set of receiver coils as a result of current flow in the windings of the other set of receiver coils is effectively canceled out by an opposite polarity voltage provided by the coupling transformer 81.

Considering now the electrode system circuits, such circuits include a signal generator 85 for supplying an alternating current signal having a frequency different from the predetermined frequency of the transmitter coil energizing current. The frequency of the current supplied by signal generator 85 is, for example, one kilocycle per second. This alternating current signal is supplied to $A_1$ feedback circuits 86, $A_0$ feedback circuits 87 and $A_2$ feedback circuits 88. Each of these feedback circuits 86, 87 and 88 is constructed to amplify this alternating current signal and then supply it by way of respective output transformers 89, 90 and 91 to the respective ones of the $A_1$, $A_0$ and $A_2$ electrodes. These individual amplified signals thus serve to energize the $A_1$, $A_0$ and $A_2$ electrodes for causing these electrodes to emit currents into the adjacent earth formations.

A current return path for the $A_1$ focussing current is provided by the $B_1$ return electrode which is connected to the other end of the secondary winding of the $A_1$ output transformer 89. A direct-current blocking condenser 92 is connected in series between the $A_1$ electrode and the output transformer 89. A current return path for the $A_2$ focussing current is provided by the $B_2$ return electrode which is connected to the $A_2$ output transformer 91. A direct-current blocking condenser 93 is connected in series between the output transformer 91 and the $A_2$ electrode. A current return path for the $A_0$ survey current is provided by the remote $B_0$ electrode which is coupled back to the $A_0$ output transformer 90 by way of a measure resistor 94 and a direct-current blocking condenser 95. Measure resistor 94 is of small resistance value.

In the operation of the electrode system, it is desired to hold the voltage level at a prescribed point intermediate the focussing and survey current electrodes at a predetermined fixed value with respect to a remote reference point represented in the present embodiment by the reference electrode N. To this end, the $M_1$ and $M_1'$ voltage monitoring electrodes are connected by way of a center tap on the primary winding of a transformer 96 and a direct-current blocking condenser 97 to one end of the primary winding of an input transformer 98 for the $A_1$ feedback circuits 86. The other or upper end of the primary winding of input transformer 98 is connected to a constant reference voltage source represented by a transformer 99. The primary winding of transformer 99 is connected to the signal generator 85 and this signal generator 85 serves to produce across the secondary winding of transformer 99 a one kilocycle reference voltage of fixed peak amplitude. The R.M.S. value of this reference voltage may be, for example, ten millivolts. Its phase angle is the same as the phase angle of the currents emitted by the $A_0$, $A_1$ and $A_2$ electrodes. The upper end of the secondary winding of reference voltage transformer 99 is connected to the remote reference electrode N.

Looking at the input transformer 98 for the $A_1$ feedback circuits, the upper end of the primary winding of this transformer is maintained at a fixed reference voltage level with respect to the N electrode by the reference voltage provided by reference voltage transformer 99. The lower end of the primary winding of input transformer 98, on the other hand, is at a voltage level corresponding to the voltage level midway between the $M_1$ and $M_1'$ voltage monitoring electrodes. If, as is desired, this voltage level midway between the voltage monitoring electrodes is equal to the fixed reference voltage, then no signal appears across the secondary winding of $A_1$ input transformer 98. If this voltage level is not equal to the reference voltage value, then an error signal proportional to the voltage difference appears across the secondary winding of $A_1$ input transformer 98. This error signal is supplied to the error signal input terminals of the $A_1$ feedback circuits. This error signal acts to adjust the gain of the $A_1$ feedback circuits so that the amplitude of the alternating-current signal passing from signal generator 85 to the $A_1$ output transformer 89 is adjusted so as to minimize the undesired voltage difference. In this manner, the $A_1$ feedback circuits automatically operate to maintain the voltage level midway between the $M_1$ and $M_1'$ voltage monitoring electrodes at the desired fixed value corresponding to the value of the reference voltage provided by the reference voltage transformer 99.

The $A_2$ feedback circuits operate in a similar manner to automatically maintain the voltage level midway between the $M_2$ and $M_2'$ voltage monitoring electrodes at this same predetermined reference voltage level with respect to the remote electrode N. In particular, the $M_2$ and $M_2'$ voltage monitoring electrodes are connected by way of a center tap on the primary winding of a transformer 100 and a direct-current blocking condenser 101 to one end of the primary winding of an input transformer 102 for the $A_2$ feedback circuits 88. The lower end of the primary winding of input transformer 102 is connected to the source of fixed reference voltage represented by the reference voltage transformer 99.

In the operation of the electrode system, it is also desired to maintain both the voltage difference between the $M_1$ and $M_1'$ voltage monitoring electrodes and the voltage difference between the $M_2$ and $M_2'$ voltage monitoring electrodes at a value of substantially zero. This is done by connecting the voltage monitoring electrodes $M_1$ and $M_1'$ to a first pair of input terminals of a signal adding circuit 103 by way of the transformer 96. At this time, the lower $M_2$ and $M_2'$ voltage monitoring electrodes are connected to a second pair of input terminals of this adding circuit 103 by way of the transformer 100.

Adding circuit 103 serves to combine the two voltage signals corresponding to the voltage differences between the two pairs of monitoring electrodes. As a consequence, the signal appearing at the output terminals of the adding circuit 103 represents the average of these two voltage differences. This average signal is supplied to the error signal input terminals of the $A_0$ feedback circuits 87. This average signal or error signal serves to automatically adjust the gain applied to the alternating-current signal passing from the signal generator 85 to the $A_0$ output transformer 90 so as to reduce the average voltage difference between the two pairs of voltage monitoring electrodes to a very small value which, for all practical purposes, is equal to zero.

The electrode system also includes output circuit means for providing an electrical signal representative of the magnitude of the current emitted by the survey current electrode $A_0$. This output circuit means includes the measuring resistor 94, an amplifier 104 and a phase sensitive detector 105. A one kilocycle phase reference signal is supplied to a second pair of input terminals of the phase sensitive detector 105. Amplifier 104 serves to amplify the small voltage signal developed by the survey current as it flows through the resistor 94 during its passage back from the $B_0$ return electrode to the $A_0$ emitting electrode. This voltage signal, which is proportional in magnitude to the magnitude of the survey current, is then detected by the phase sensitive detector 105 to produce at the output terminals of the detector 105 a unidirectional or direct-current signal having a magnitude which is proportional thereto. The unidirectional signal at the output of phase sensitive detector 105 is transmitted by way of cable conductor 22$e$ to a logarithmic circuit 106 located at the surface of the earth. The resulting logarithmic signal at the output of logarithmic circuit 106 is supplied to the galvanometer 42 to produce the recorder trace for the EL-S electrode system.

The present investigating apparatus also includes means for recording the spontaneous earth potential existing in the borehole 16. As indicated in FIG. 3, this means includes the $A_0$ survey current electrode, which electrode is also used to detect the spontaneous earth potential. This spontaneous earth potential is of a direct-current nature. In order to record this direct-current potential, the $A_0$ electrode is connected in a direct-current manner by way of the secondary winding of output transformer 90, an alternating-current blocking inductor 107 and a cable conductor 22$f$ to the galvanometer 43 located at the surface of the earth. Galvanometer 43 serves to record the magnitude of this spontaneous earth potential as an additional trace on the recording medium 52. The alternating-current blocking inductor 107 serves to prevent any one kilocycle current from being supplied to the spontaneous potential galvanometer 43. Also, the various direct-current blocking condensers 92, 93, 95, 97 and 101 are used to prevent undesired direct-current current flow paths for the spontaneous earth potential between different ones of the electrodes of the electrode system.

Considering now the operation of the apparatus thus far described, as the downhole portion of the apparatus comprising the support member 20 and the fluid-tight housing 21 is moved through the borehole, the two signal generators 70 and 85 are continuously operative to supply energizing currents to the transmitter coils $T_1$, $T_2$ and $T_3$ and to the current-emitting electrodes $A_0$, $A_1$ and $A_2$, respectively. As a consequence, the transmitter coils $T_1$, $T_2$ and $T_3$ produce alternating magnetic flux fields which extend outwardly into the adjacent earth formations. These alternating flux fields induce alternating current flow in the adjacent formation material. These currents induced in the formation material flow in generally circular loops which are concentric with the borehole 16. These induced currents create secondary electromagnetic flux fields which couple with the various receiver coils and, hence, induce voltage components therein. The magniutde of these voltage components is proportional to the magnitude of the current flow in the earth material and, hence, proportional to the conductivity of such earth material.

Considering first the IL-D receiver coils $R_1$, $R_2$ and $R_3$, these receive coils are constructed to cooperate with the transmitter coils $T_1$, $T_2$ and $T_3$ so that these receiver coils respond primarily only to the formation current which is flowing at a relatively large lateral distance from the borehole 16. This selective response is obtained by the proper selection of the spacings, polarities and relative numbers of turns for the coils $T_1$, $T_2$, $T_3$, $R_1$, $R_2$, and $R_3$. Consequently, the net voltage component developed across the series-connected receiver coils $R_1$, $R_2$ and $R_3$ which is in phase with the transmitter coil energizing current is directly proportional to the conductivity of the formation material in a lateral zone which is relatively far removed from the borehole 16. This net in-phase component is detected by the phase selective circuits 73 to provide the desired conductivity signal.

Quadrature-phase (either 90° or 270°) voltage components may also appear across the output terminals of the series-connected receiver coils $R_1$, $R_2$ and $R_3$, primarily because of direct mutual coupling between the transmitter and receiver coils. The coil system is, however, constructed to provide a minimum of such direct mutual coupling. In any event, the phase selective circuit 73 operates to reject any such quadrupture-phase voltage components.

The resulting IL-D conductivity signal appearing at the output of the phase selective circuit 73 is supplied to the computer 75 which is located at the surface of the earth. The computer 75 operates to improve the vertical focussing characteristics of this conductivity signal, which is designated as $V_d$. More particularly, the computer 75 operates to compute the corresponding conductivity signal that would have been provided by a coil system having a sharper or narrower vertical response than the IL-D coil system which is actually used. What is done, in effect, is to remove from the actual conductivity signal $V_d$, the signal components contributed by formation regions lying more than a prescribed distance above or below the horizontal center line of the IL-D coil system. Consequently, the computed signal $V_d'$ appearing at the output of computer 75 is still proportional to the conductivity of the formation material in a zone at a large lateral distance from the borehole 16, the difference being that the vertical thickness of this zone has been reduced.

The computed conductivity $V_d'$ is supplied to a skin effect and logarithmic circuit 76. This circuit 76 serves to perform two functions. First, it corrects the computed conductivity signal so as to compensate for any signal loss caused by the occurrence of electrical skin effect phenomena in the formation material. Secondly, it serves to convert the conductivity signal to a signal which is proportional to the logarithm thereof. Consequently, the signal $V_d''$ appearing at the output of circuit 76 is a signal which is proportional to the logarithm of the formation conductivity in the selected zone and which contains very little, if any, error due to the occurrence of electrical skin effect. This logarithmic signal $V_d''$ is then supplied to the galvanometer 40 to produce the appropriate trace on the recording medium 52.

At the same time that the IL-D receiver coils are operating to provide the deep zone conductivity signal, the IL-M receiver coils $r_1$, $r_2$, $r_3$ and $r_4$ are operating to provide a medium zone conductivity signal. In particular, the IL-M receiver coils $r_1$, $r_2$, $r_3$ and $r_4$ are constructed to cooperate with the transmitter coils $T_1$, $T_2$ and $T_3$ so as to respond primarily only to the earth currents which are flowing in a zone which is at a medium distance from the borehole 16. This selective response is obtained by proper selection of the spacings, number of turns and relative polarities of the coils $T_1$, $T_2$, $T_3$, $r_1$, $r_2$, $r_3$ and $r_4$. Consequently, the net voltage component induced across the series-connected receiver coils $r_1$, $r_2$, $r_3$ and $r_4$ which is in phase with the transmitter coil energizing current is proportional to the conductivity of the formation material in this medium zone. This voltage component is detected by the phase selective circuits 79, any residual quadrature-phase component being rejected by these circuits 79.

The medium zone conductivity signal appearing at the output of phase selective circuits 79 is supplied to a logarithmic circuit 80 located at the surface of the earth, this medium zone conductivity signal being designated as $V_m$. Logarithmic circuit 80 operates to produce an output signal $V_m'$ which is directly proportional to the logarithm of the incoming conductivity signal $V_m$. This logarithmic signal is then supplied to the galvanometer 41 to produce the appropriate trace on the recording medium 52.

It is noted that no vertical focussing computer or skin effect correction is provided for the case of the medium zone conductivity signal. No vertical focussing computer is necessary in this case because, since less lateral depth of penetration is required of the coil system, it can be constructed to provide a greater degree of vertical focussing. No skin effect correction is required for this medium zone signal because very little skin effect error is usually encountered where the net response of the coil system is limited to regions which are closer in to the coil system. If desired, however, skin effect correction can be provided for the medium zone signal in the same manner as for the deep zone signal.

Considering now the electrode system, the signal generator 85 is continuously operative to supply energizing voltages to the current-emitting electrodes $A_1$, $A_0$ and $A_2$, these voltages being supplied by way of the feedback circuits 86, 87 and 88, respectively. Consequently, each of the electrodes $A_1$, $A_0$ and $A_2$ operates to emit alternating current which flows outwardly from each of these electrodes and into the adjacent earth formation in all radial directions. The focussing current emitted from the upper and lower $A_1$ and $A_2$ electrodes serves to force the survey current flowing from the $A_0$ electrode into a beam of relatively narrow vertical thickness. This survey current beam is being emitted all around the circumference of the support member 20 so that the volume of formation material being traversed by this survey current is in the form of a circular disc surrounding the $A_0$ electrode.

The survey current is maintained in a focussed beam, even though the formation and borehole resistivities vary, because of the automatic feedback control action provided by the voltage monitoring electrodes $M_1$, $M_1'$ and $M_2$ and $M_2'$ and the $A_0$ feedback circuits 87. In particular, proper focussing of the survey current beam is indicated by the occurrence of a zero voltage difference between each pair of the voltage monitoring electrodes. Such a zero potential difference indicates that no current is flowing in a vertical direction in the immediate vicinity of the monitoring electrodes being considered. If the voltage difference between either the $M_1$, $M_1'$ pair of monitoring electrodes or the $M_2$, $M_2'$ pair of monitoring electrodes departs from this desired zero value, then an error signal is fed back by way of adding circuit 103 to the $A_0$ feedback circuits 87 to adjust the magnitude of the survey current being emitted by the $A_0$ electrode. This adjustment serves to re-establish the desired focussed pattern.

At the same time, the magnitude of the focussing currents emitted by the $A_1$ and $A_2$ electrodes is subject to adjustment. These focussing current adjustments are used to maintain the regions midway between the two pairs of monitoring electrodes at a substantially constant voltage level. In particular, the $A_1$ feedback circuits 86 operate to control the magnitude of the focussing current emitted from the $A_1$ electrode so as to hold the region midway between the $M_1$ and $M_1'$ monitoring electrodes at the desired constant voltage level. At the same time, but independently therefrom, the $A_2$ feedback circuits 88 operate to control the magnitude of the $A_2$ current so as to hold the region midway between the second pair of monitoring electrodes $M_2$ and $M_2'$ at this same desired constant voltage level.

In order to prevent the survey current beam from the $A_0$ electrode from penetrating too deeply into the adjacent earth formation, the return electrodes $B_1$ and $B_2$ for the focussing currents are placed relatively close to the $A_1$ and $A_2$ electrodes. This means that the focussing currents are returned to the borehole more quickly and, hence, do not penetrate as deeply into the adjacent formation. As a consequence, the survey current beam from the $A_0$ electrode will remain focussed for only the lateral distance over which the adjacent focussing current components are flowing in a generally lateral direction. Once the survey current beam gets out past this point, it spreads out fairly rapidly and, hence, rapidly dissipates its effectiveness. The significant part of the survey current flow is the part in the region where the current density is the greatest, namely, in the region where the survey current is being confined to a relatively narrow beam. This is the region where the greatest resistance is offered to the flow of the survey current. Consequently, the magnitude of the survey current is determined primarily by the electrical conductivity of the formation material in this restricted region, which is a region which is immediately adjacent the borehole 16.

The magnitude of the survey current flowing from the $A_0$ electrode is measured by means of the measuring resistor 94 and the amplifier 104. The voltage drop across this resistor 94 is proportional to the magnitude of the survey current and, hence, to the conductivity of the formation material immediately adjacent the borehole 16. This voltage signal is amplified by amplifier 104 and converted to a corresponding direct-current signal by the phase sensitive detector 105. The resulting conductivity signal at the output of phase sensitive detector 105 is supplied to a logarithmic circuit 106 located at the surface of the earth. This shallow zone conductivity signal is designated as $V_s$. Logarithmic circuit 106 operates to develop an output signal $V_s'$ which is directly proportional to the logarithm of the incoming conductivity signal $V_s$. This logarithmic signal $V_s'$ is supplied to the galvanometer 42 to produce the appropriate trace on the recording medium 52.

At the same time that all the foregoing measurements are being made, the magnitude of the spontaneous earth potential at the level of the $A_0$ electrode is also being monitored and recorded by the galvanometer 43. This spontaneous earth potential is of a direct-current nature and a direct-current path is provided between the $A_0$ electrode and the galvanometer 43 by way of the secondary winding of output transformer 90, the inductor 107 and cable conductor 22f. The other side of the galvanometer 43 is grounded at the surface of the earth in an appropriate manner.

Figure 4:
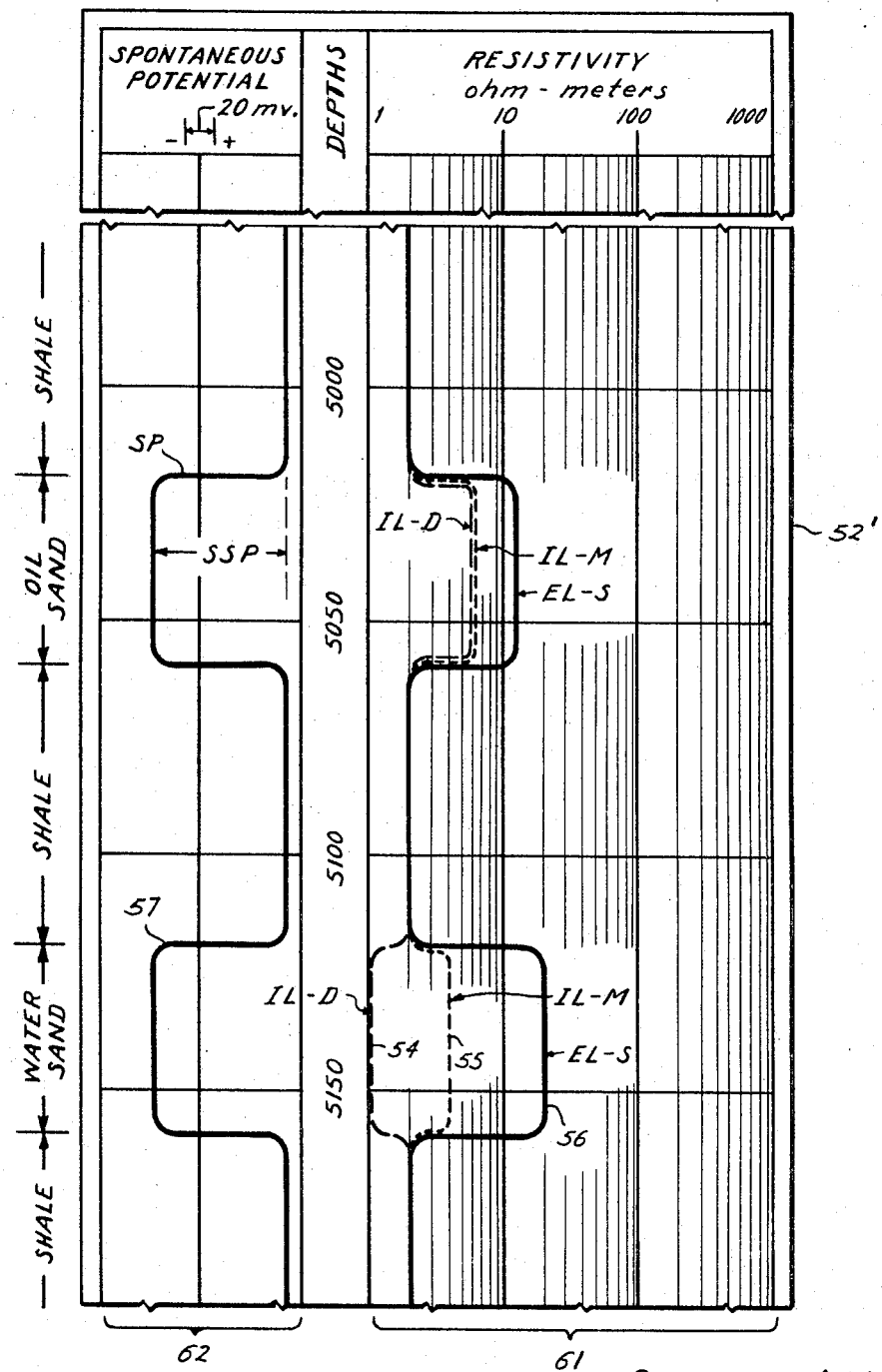
FIG. 4 shows a portion of a typical record or log that is obtained with the apparatus of FIG. 1.

A portion of a typical record or "log" obtained with the present embodiment of apparatus is indicated in FIG. 4 of the drawings. This log 52' is a positive print made from the photosensitive recording medium 52 after it has been chemically processed or developed in the appropriate manner. The various grid lines and headings on the log 52' are placed on the photosensitive recording medium 52 during the course of the borehole measurements by means of suitable optical masks, shutters and intermittant auxiliary light sources in a manner which is known in the art.

As seen in FIG. 4, the traces or recorded curves 54, 55 and 56 for the IL–D, IL–M and EL–S systems, respectively, are recorded on the right-hand portion 61 of the recording medium. The spontaneous potential curve 57, on the other hand, is separately recorded on an adjacent portion 62 of the recording medium. The scale calibration for the IL–D, IL–M and EL–S traces is logarithmic in nature since the signals which produce these traces were converted to logarithmic signals by the logarithmic circuits 76, 80 and 106. It is noted, however, that this logarithmic scale calibration is in terms of "resistivity" and not "conductivity." This is rather unusual since the signals supplied by the downhole exploring systems are "conductivity" signals. It results from a novel relationship between conductivity and resistivity when these factors are considered on a logarithmic basis.

As is known, conductivity is the reciprocal of resistivity. Expressed mathematically:

$$C = 1/R \qquad (1)$$

where

C = conductivity
R = resistivity

Taking the logarithm of both sides of Equation 1 leads to the relationship:

$$\log C = -\log R \qquad (2)$$

Thus, a logarithmic resistivity signal is simply a negative version of a logarithmic conductivity signal. In terms of the recording medium, the negative sign relates to the direction of deflection of the galvanometer light beam for increasing signal magnitudes, whether from left to right or from right to left.

In the present apparatus, since the signals supplied to the galvanometers 40, 41 and 42 are conductivity signals, each of these galvanometers is mechanically adjusted so that its zero or "at rest" position causes its light beam to fall on the right-hand extremity of the scale range 61. Then, as the magnitude of the conductivity signal supplied to the galvanometer increases, the light beam is deflected across the recording medium 52 toward the left. Thus, from right to left is the positive direction for a logarithmic conductivity signal. The positive direction for the resistivity scale (the direction of increasing values) is, as indicated on the log 52', from left to right. Thus, the direction of trace deflection for increasing signal values is of opposite polarity or direction to the direction of the increasing scale calibration values and, hence, the relationship of Equation 2 is satisfied. In this manner, the present invention provides a novel means of converting one form of signal indication to a reciprocal form of signal indication.

The fact that the IL-D, IL-M and EL-S signals are recorded on a common recording medium to the same scale factor and the fact that the scale factor is logarithmic in character provides a recorded log which is more readily and easily interpreted and which provides more direct indications of the significant subsurface parameters. The shallow penetration electrode system curve (trace 56 of FIG. 4) provides an indication of the resistivity $R_{xo}$ of the flushed portion of the invaded zone immediately adjacent the borehole wall. The deep penetration coil system curve (trace 54 of FIG. 4) provides an indication of the resistivity $R_t$ of the uncontaminated portion of the formation beyond the invaded zone. The medium penetration coil system curve (trace 55 of FIG. 4) provides an indication of the resistivity of an intermediate zone which will be affected to a greater or lesser degree by mud filtrate invasion, depending on the lateral depth or diameter of such invasion. Consequently, the coincident recording of these three measurements on a common recording medium, as indicated in FIG. 4, indicates at a glance the manner in which the formation resistivity is changing as a function of the lateral or horizontal distance from the borehole.

The separation distance between the two coil system curves (traces 54 and 55) provides an indication of the lateral depth of mud filtrate invasion. If the depth of invasion is relatively shallow, then neither the IL-D nor the IL-M measurement will be appreciably affected by such invasion. In this case, the two traces 54 and 55 will lie on top of one another. This situation is illustrated in FIG. 4 for the oil sand in the vicinity of the 5050 foot depth level. It is also the case for the various shale strata since shale is not permeable and, hence, not subject to any appreciable mud filtrate invasion. (In fact, all three traces should lie on top of one another for the case of thick shale beds.) As the lateral depth of filtrate invasion increases, the separation distance between the IL-D and the IL-M traces increases. This is because the IL-M measurement is being affected more and more by the filtrate invasion. An example of an appreciable depth of invasion is illustrated in the case of the water sand located in the vicinity of the 5150 foot depth level in FIG. 4. For any given ratio of filtrate resistivity to formation water resistivity, this separation distance can be calibrated directly in terms of the diameter $D_i$ of the filtrate invaded zone.

A particularly significant feature of the recorded logs provided with the present apparatus is that the separation distance between the IL-D trace and the EL-S trace (traces 54 and 56 of FIG. 4) is directly related to the formation water saturation factor $S_w$ when both traces are recorded on a common logarithmic scale. This is important because the pore spaces in the subsurface earth formations are almost always completely filled with fluids of one type or another. In the absence of mud filtrate invasion, these fluids are either hydrocarbon fluids or formation water, or some of each. Thus, if the formation pore space is 100% saturated with water ($S_w = 100\%$), then there is no oil or other hydrocarbon present. If, on the other hand, the formation pore space is 20% filled with formation water ($S_w = 20\%$), then the other 80% of the pore space contains oil or other hydrocarbon fluid. In this manner, knowing the percentage water saturation $S_w$ also tells how much oil or other hydorcarbon is present.

The relationship between the water saturation $S_w$, the formation porosity $\phi$, the resistivity of the formation water $R_w$ and the resistivity $R_t$ of the formation as a whole is described by the following mathematical expression.

$$S_w^2 = aR_w/\phi^m R_t \qquad (3)$$

where $a$ and $m$ are constants which depend on the particular type of rock structure being investigated. Equation 3 is applicable only to formation zones which have not been contaminated by mud filtrate invasion.

For the case of the flushed zone immediately adjacent the borehole wall, the original formation water has been completely replaced by mud filtrate and, hence, the saturation relationship of Equation 3 can be rewritten as follows for the flushed zone:

$$S_{xo}^2 = aR_{mf}/\phi^m R_{xo} \qquad (4)$$

where $S_{xo}$ is the percentage filtrate staturation in the flushed zone, $R_{mf}$ is the resistivity of the mud filtrate and $R_{xo}$ is the resistivity of the flushed zone as a whole.

Combining Equations 3 and 4, it is seen that:

$$S_w = S_{xo}\sqrt{\left(\frac{R_w}{R_{mf}}\right)\left(\frac{R_{xo}}{R_t}\right)} \qquad (5)$$

In the case of formations which were originally 100% water bearing, $S_{xo}$ is equal to unity. In formations which contain oil, it sometimes happens that the oil is not completely removed from the flushed zone. In this case, $$S_{xo} = (1 - ROS) \qquad (6)$$

where ROS is the residual oil saturation expressed as a fraction of the pore space.

The ratio of $R_w$ to $R_{mf}$ is usually fairly constant over considerable lengths of the borehole. Consequently, changes in the ratio of $R_{xo}$ to $R_t$ provide a direct indication of changes in the water saturation $S_w$. With the present apparatus, the EL-S trace provides an indication of $R_{xo}$ while the IL-D trace provides an indication of $R_t$.

Since these two traces are recorded on a common logarithmic scale, the magnitude of the separation distance therebetween is numerically related to the ratio of $R_{xo}$ to $R_t$ and, hence, to the fractional water saturation $S_w$. In particular, as the water saturation increases, the separation distances between the EL–S and IL–D traces increases.

If the ratio of $R_w$ to $R_{mf}$ were always the same, then the separation distances between the EL–S trace and the IL–D trace could be scaled off directly in terms of the fractional water saturation $S_w$. This could be done on a separate movable scale or ruler which could be laid on top of the recorded log to measure this separation distance. Since, the ratio of $R_w$ to $R_{mf}$ may vary somewhat from one section of a borehole to another, a plurality of such scales would be required for the different values of such ratio commonly encountered.

In this regard, the spontaneous potential trace (trace 57 of FIG. 4) is particularly useful. This is because the static spontaneous potential (SSP) is related to the ratio of $R_w$ to $R_{mf}$ in the manner indicated by the following expression:

$$SPS = k \log \frac{R_w}{R_{mf}} \qquad (7)$$

By "static" SP is meant the peak value of the SP curve in a permeable bed relative to its value in a nearby shale formation. Thus, the SP trace can be used to indicate the precise scale calibration to be used in measuring the separation distance between the EL–S and IL–D traces. Also, when different permeable beds have approximately the same static SP value, they can be compared directly to determine their relative water saturations.

For the examples given in FIG. 4, the oil sand shows a water saturation value of 32%. Consequently, 68% of the pore space contains oil. For the water sand at the 5150 foot depth, the water saturation is 100%. These differences in water saturation are readily apparent from the differences in the separation differences between the IL–D and EL–S curves in the two beds. For these examples, the formation water resistivity $R_w$ was taken to be 0.05 ohm-meter, the mud filtrate resistivity was taken to be 1.0 ohm-meter, the porosity of the oil sand was taken to be 25% and the porosity of the water sand was taken to be 20%.

In order that the two coil systems and the electrode system may have the desired lateral penetration characteristics and, at the same time, not appreciably interfere with one another, it is necessary that these coil and electrode systems be constructed in a very particular manner. Considerable care must be exercised in the construction and relative positioning of the various elements of these systems. One set of dimensions which has been found to be particularly suitable for this purpose is given by the following tables:

TABLE I.—COIL SYSTEMS

| Coil | Distance from $A_0$ (inches) | Relative number of turns |
| --- | --- | --- |
| $T_3$ | 115 | −0.15 |
| $R_1$ | 85 | +1.00 |
| $r_4$ | 79 | −0.12 |
| $R_2$ | 75 | −0.25 |
| $T_2$ | 55 | −0.58 |
| $T_1$ | 45 | +2.25 |
| $r_3$ | 25 | −0.15 |
| $R_3$ | 15 | −0.20 |
| $r_1$ | 11 | +1.00 |
| $r_2$ | −15 | −0.50 |

TABLE II.—ELECTRODE SYSTEM

| Electrode: | Distance from $A_0$ inches |
| --- | --- |
| $B_2$ | 100 |
| $B_1$ | 96 |
| $A_1$ | 20 |
| $M_1'$ | 8 |
| $M_1$ | 6 |
| $A_0$ | 0 |
| $M_2$ | −6 |
| $M_2'$ | −8 |
| $A_2$ | −20 |

In both Tables I and II, the distances are longitudinal distances measured between the center of the $A_0$ electrode and the center of the particular element being considered. Positive distances indicate that the element is located above the $A_0$ electrode, while negative distances indicate that the element is located below the $A_0$ electrode. In Table I, the number of turns for the various coils are expressed on a relative basis. The actual number of turns may assume any set of values which is obtained by multiplying these relative values by a common multiplier. The polarity signs for the relative turns indicate the relative polarities of the coils, where the main coils $T_1$, $R_1$ and $r_1$ are taken as being of positive polarity.

Another factor which must be taken into consideration is the fact that the measure points for the different exploring systems are located at different longitudinal levels along the support member 20. These measure points or measure levels for the various systems are indicated by the appropriately labeled reference lines in FIG. 1. With respect to the $A_0$ electrode, they are:

TABLE III.—SYSTEM MEASURE POINTS

| System: | Distance from $A_0$, inches |
| --- | --- |
| IL–D | 65 |
| (IL–D') (computed IL–D) | −15 |
| IL–M | 20 |
| EL–S | 0 |
| SP | 0 |

Roughly, the measure points correspond to the longitudinal midpoints of the systems. For the coil systems, the measure points may be shifted somewhat to one side or the other of the physical midpoint depending on how the numbers of coil turns are distributed. For the deep investigating IL–D coil system, the actual measure point of the coil array is located 65 inches above the center of the $A_0$ electrode. For this system, however, the computer 75 located at the surface of the earth serves to provide an 80 inch depth shift. Thus, at any given instant, the computed signal $V_d'$ at the output of computer 75 is for a depth level which is 80 inches below the depth level for the $V_d$ signal being supplied to the input of the computer 75 at that same moment. Consequently, the measure point for the computed IL–D signal, designated as IL–D' in Table III, is located 15 inches below the $A_0$ electrode.

From Table III, it is seen that two of the signals, namely, the EL–S and the SP signal are being obtained at the level of the $A_0$ electrode and, hence, require no depth correction. For the other two signals, the IL–M signal is being obtained 20 inches above the $A_0$ electrode while the computed IL–D signal is being obtained 15 inches below the $A_0$ electrode. These depth discrepancies are corrected in the recorder 38 by the appropriate adjustment of the aperture plates 47 and 48. In particular, the aperture plate 47 is adjusted so that the computed IL–D signal is recorded a distance $l_1$ below the reference line 64 at which the EL–S and SP signals are being recorded. This distance $l_1$ on the recorder depth scale corresponds to a distance of 15 inches in the borehole. The aperture plate 48 for the IL–M signal is adjusted so that the signal is recorded is distance $l_2$ above the reference level 64, which distance corresponds to 20 inches in the borehole.

Figure 5B:
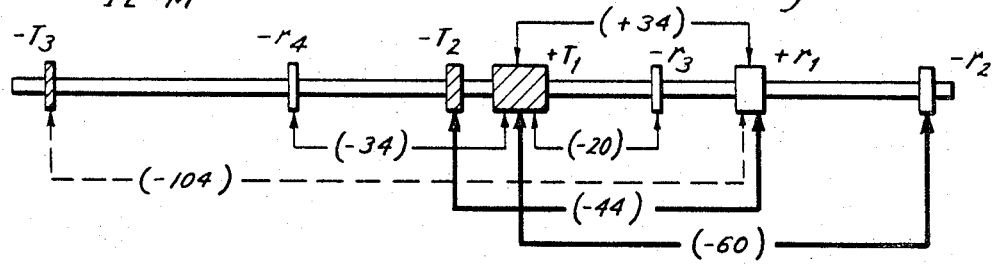

The manner in which the two coil systems IL–D and IL–M are constructed to provide the appropriate lateral investigation depths will be explained with the aid of FIGS. 5A and 5B. These figures give a separate representation of each of the two coil systems, the common transmitter coils appearing in each representation. The depth of investigation for any given coil system is dependent on the separation distances and the relative weights or sensitivities of each of the individual two-coil transmitter-receiver coil pairs which go to make up the system. The number N of individual two-coil pairs in any given multi-coil system is:

$$N = N_T \cdot N_R \qquad (8)$$

where $N_T$ is the number of transmitter coils and $N_R$ is the number of receiver coils. For the IL–D system, for example, there is a total of nine transmitter-receiver pairs since this system includes three transmitter coils and three receiver coils.

The various individual coil pairs, their separation distances (measured between coil midpoints) and their relative sensitivities are given by the following tables:

TABLE IV.—SENSITIVITIES FOR IL–D

| Coil pair | Spacing (inches) | Relative sensitivity |
|---|---|---|
| $T_3R_3$ | 100 | +0.03 |
| $T_1R_1$ | 40 | +5.45 |
| $T_2R_3$ | 40 | +0.30 |
| $T_3R_2$ | 40 | +0.12 |
| $T_1R_2$ | 30 | −1.82 |
| $T_1R_3$ | 30 | −1.45 |
| $T_2R_1$ | 30 | −1.88 |
| $T_3R_1$ | 30 | −0.48 |
| $T_2R_2$ | 20 | +0.73 |
| Net | | +1.00 |

TABLE V.—SENSITIVITIES FOR IL–M

| Coil pair | Spacing (inches) | Relative sensitivity |
|---|---|---|
| $T_3r_2$ | 130 | +0.03 |
| $T_3r_1$ | 104 | −0.08 |
| $T_3r_3$ | 90 | +0.01 |
| $T_2r_2$ | 70 | +0.22 |
| $T_1r_2$ | 60 | −0.98 |
| $T_2r_1$ | 44 | −0.68 |
| $T_3r_4$ | 36 | +0.03 |
| $T_1r_1$ | 34 | +3.47 |
| $T_1r_4$ | 34 | −0.43 |
| $T_2r_3$ | 30 | +0.15 |
| $T_2r_4$ | 24 | +0.15 |
| $T_1r_3$ | 20 | −0.89 |
| Net | | +1.00 |

The relative sensitivity for each pair is determined in accordance with the relationship:

$$W = \frac{\frac{A_t A_r}{L}}{\Sigma \left( \frac{A_t A_r}{L} \right)} \quad (9)$$

where W denotes the relative weight or sensitivity, $A_t$ is the product of cross-sectional area times number of turns for a transmitter coil, $A_r$ is the product of cross-sectional area times number of turns for a receiver coil and L is the spacing between the transmitter and receiver coil being considered. If all cross-sectional areas are the same, then only the number of turns need be considered. The summation factor forming the denominator of Equation 9 is used to normalize the relative sensitivities so that the algebraic sum of the individual sensitivities is equal to unity. This puts the relative sensitivities on a fractional or percentage basis and makes their comparison somewhat easier. The polarity of the relative sensitivity is determined by the polarities of the two coils comprising the pair. If both are of the same polarity, then the relative polarity for the pair is positive. Otherwise, it is negative.

From Tables IV and V, the significance of the main coil pair in each system, namely, the $T_1R_1$ pair of the IL–D system and the $T_1-r_1$ pair of the IL–M system is readily apparent. These main pairs have relative sensitivities which are noticeably greater than the remainder of the coil pairs in the system.

In order to provide a relatively deep lateral depth of investigation for a focussed coil system, it is necessary that the relative sensitivities of the transmitter-receiver coil pairs which have a spacing or separation distance equal to or greater than the spacing of the main coil pair be predominantly of the same polarity as the polarity of the main pair sensitivity. Since the assumptions regarding the main pair polarities make the main pair sensivity positive, the relatve sensitivities of the other large spacing coil pairs must also be predominantly positive. From Table IV, it is seen that this condition is met by the IL–D coil system since the net relative sensitivity of all the coil pairs having a separation distance equal to or greater than the separation distance of the main pair $T_1-R_1$ is positive. In fact, not only is the net or algebraic sum of these sensitivities positive, but the individual sensitivities of each of these coil pairs is also positive.

Another way of looking at it is to say that the negative sensitivity pairs are made to have short spacings compared to the main pair spacing. The manner in which this is done is graphically illustrated in FIG. 5A. All of the negative sensitivity spacings are indicated in FIG. 5A and, as seen by comparison with the positive main pair spacing +40, these negative spacings are all less than this main pair spacing.

In order to provide a reduced lateral depth of investigation, as is required for the medium depth IL–M system, it is necessary that the net relative sensitivity of all the resulting transmitter-receiver coil pairs having a separation distance equal to or greater than the separation distance of the main coil pair $T_1-r_1$ be of opposite (negative) polarity to the sensitivity of the main pair. That the IL–M system meets this condition may be verified from the data of Table V. The significance of this requirement may be seen from the representation of the IL–M system in FIG. 5B, wherein all of the negative sensitivity spacings are shown. From FIG. 5B, it is seen that the IL–M system has significant negative sensitivities associated with coil spacings which are greater than the spacing +34 of the main pair.

From the foregoing, it is seen that large positive spacings tend to increase the lateral depth of investigation, while large negative spacings tend to decrease the lateral depth of investigation.

Another useful way of comparing focussed coil systems is to consider their effective lengths. The effective length L′ of a focussed coil system may be defined as:

$$L' = \frac{\Sigma (A_t A_r)}{\Sigma \left( \frac{A_t A_r}{L} \right)} \quad (10)$$

An evaluation of the effective lengths for the IL–D and IL–M coil systems shows that the IL–D system has an effective length of 81 inches while the IL–M system has an effective length of 18 inches. As a rule, the greater the effective length, the greater the lateral depth of investigation.

The construction of the various electrodes comprising the EL–S electrode system and their location relative to the coil system coils also requires considerable care. Various factors which should be taken into consideration are discussed in the above-mentioned co-pending application Ser. No. 743,604 of Schneider. The particular embodiments described in this co-pending application relate to the combination of a single coil system with a single electrode system. The various considerations therein set forth are, however, also applicable to the present apparatus and, if followed, will enable the proper construction and location of the electrodes of the present apparatus.

Figure 6:
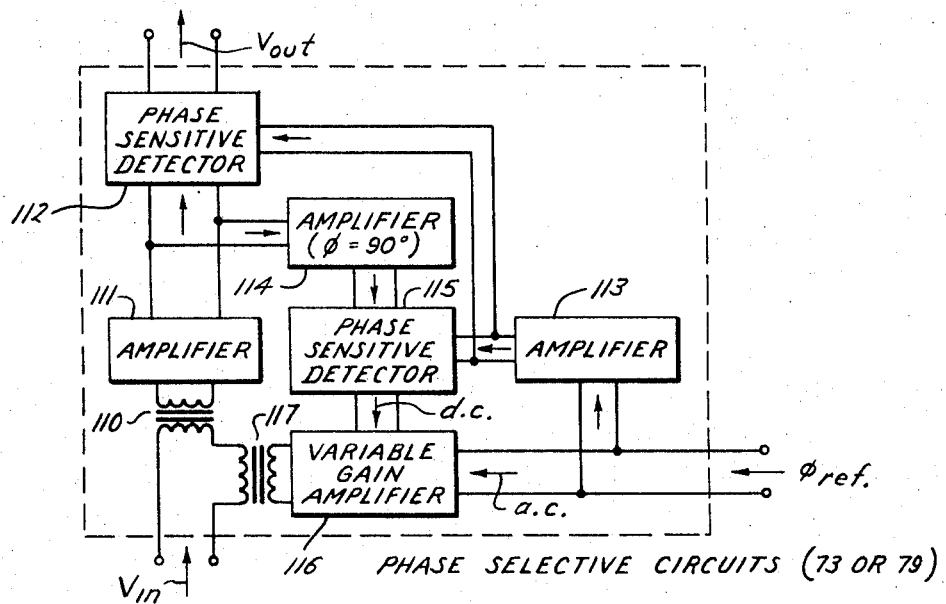
FIG. 6 shows in greater detail the construction of an individual one of the coil system phase selective circuits of FIG. 3.

Referring now to FIG. 6 of the drawings, there is shown in greater detail the manner of construction for the phase selective circuits 73 and 79 of FIG. 3. Since each of these sets of phase selective circuits 73 and 79 is of identical construction, only a single set of phase selective circuits is shown in FIG. 6. As shown in FIG. 6, the net receiver coil voltage $V_{tn}$ for one of the coil systems is supplied by way of a transformer 110 and an amplifier 111 to a phase sensitive detector 112. The phase reference signal $\phi_{ref}$ developed across resistor 74 (FIG. 3) is supplied to the phase sensitive detector 112 by way of an amplifier 113. The resulting unidirectional output signal $V_{out}$ from the phase sensitive detector 112 is the signal that is transmitted to the surface of the earth.

In addition to the phase discrimination provided by the phase sensitive detector 112, an automatic feedback loop is also provided for minimizing any residual quadrature-phase components contained in the input signal $V_{in}$. This feedback loop includes a phase shifting amplifier 114, a phase sensitive detector 115, a variable gain amplifier 116 and a transformer 117, the secondary winding of which is connected in series with the signal path for the input signal $V_{in}$. Amplifier 114 monitors the signal appearing at the output of amplifier 111. The amplifier 114 provides a phase shift of 90° to this monitored signal and then supplies it to a first input of the phase sensitive detector 115. The 90° phase shift serves to place the quadrature-phase components at the output of amplifier 111 in an in-phase phase relationship wih respect to the phase reference signal. The phase reference signal is supplied to a second input of the phase sensitive detector 115. Consequently, the unidirectional signal appearing at the output of detector 115 is proportional in magnitude to the magnitude of any quadrature-phase components at the output of amplifier 111.

This unidirectional signal is then used to control the gain of variable gain amplifier 116. The gain of amplifier 116 determines the amount of the alternating current phase reference signal which is passed from the A.C. input of amplifier 116 to the transformer 117. The variable gain amplifier 116 together with the output transformer 117 are constructed so that the resulting alternating-current voltage produced across the secondary of transformer 117 is shifted in phase by 90° with respect to the phase of the phase reference signal. There thus appears across the secondary of transformer 117 a quadrature-phase voltage which is adjusted by the feedback loop to be equal in magnitude and opposite in polarity to any quadrature-phase components in the input voltage $V_{in}$.

Figure 7:
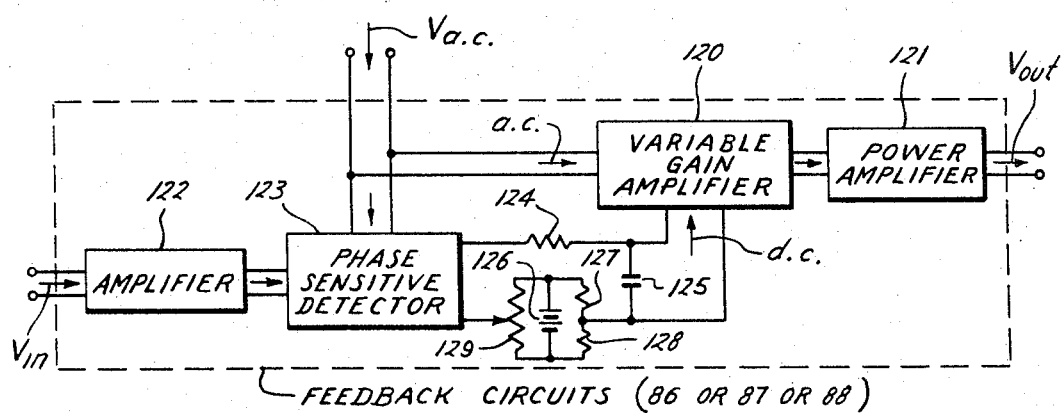
FIG. 7 shows in greater detail the construction of an individual one of the electrode system feedback circuits of FIG. 3.

Each of the feedback circuits 86, 87 and 88 in the electrode system portion of FIG. 3 is of identical construction. This form of construction for a single one of these feedback circuits is indicated in greater detail in FIG. 7 of the drawings. As shown in FIG. 7, the $V_{ac}$ signal is the one kilocycle signal supplied by the signal generator 85, the $V_{in}$ signal is the alternating-current error signal obtained from the voltage monitoring electrodes and $V_{out}$ is the alternating-current signal which is supplied to the appropriate current-emitting electrode. The $V_{ac}$ signal from signal generator 85 is of constant magnitude. It is amplified by a variable gain amplifier 120 and a power amplifier 121 to form a $V_{out}$ energizing signal which is supplied to the current-emitting electrode.

The magnitude of th energizing signal applied to the current-emitting electrode is adjusted by adjusting the gain of the variable gain amplifier 120. This gain adjustment is controlled by the alternating-current feedback error signal $V_{in}$ obtained from the voltage monitoring electrodes. This alternating-current signal $V_{in}$ is supplied by way of an amplifier 122 to a first input of a phase sensitive detector 123. The alternating-current energizing signal $V_{ac}$ is supplied to a second input of the phase sensitive detector 123 to serve as a phase reference signal for this phase sensitive detector. It is of the same phase as the alternating current emitted from the various current-emitting electrodes. Under the control of this phase reference signal, the phase sensitive detector 123 operates to develop a unidirectional output signal which has a magnitude which is proportional to the magnitude of the feedback error signal $V_{in}$. This unidirectional or direct-current signal is then supplied by way of a low-pass filter formed by a resistor 124 and condenser 125 to a gain control terminal of the variable gain amplifier 120. The polarities around the feedback loop are such that the gain adjustment produced by the direct-current signal is in a direction which will reduce the feedback error signal $V_{in}$ to zero.

The feedback circuits of FIG. 7 also include a biasing means for establishing a predetermined gain value for the amplifier 120 whenever the feedback error signal $v_{in}$ is zero. This biasing means includes a source of direct-current voltage represented by a battery 126, a pair of resistors 127 and 128 and an adjustable potentiometer 129. The biasing means is in the form of bridge circuit so that when the sliding tap on potentiometer 129 is set at the midpoint of the potentiometer, a zero voltage difference will exist between the sliding tap and the midpoint connection between the resistors 127 and 128. By moving the sliding tap either up or down, either a positive or a negative voltage will be introduced in series with the output of the phase sensitive detector 123. This votage from potentiometer 129 constitutes the biasing voltage or idling voltage for the variable gain amplifier 120. Its value is selected by a suitable adjustment of the potentiometer 129 so that the variable gain amplifier 120 will have a certain prescribed value of gain in the absence of any feedback error signal $V_{in}$.

The fact that the gain of variable gain amplifier 120 can be set at a prescribed value in the absence of any feedback error signal is an important advantage of the present invention. Under severe borehole conditions, the feedback error signal tends to become relatively small and difficult to distinguish from the electrical noise which is present. This does not cause too great a concern with the present circuits because the idling bias can be set to provide approximately the correct energizing voltage for the current-emitting electrodes even though the feedback error signal is completely absent. Where the constant voltage level maintained intermediate each pair of voltage monitoring electrodes is equal to 10 millivolts, then the idling bias for the variable gain amplifier of the $A_0$ feedback circuits 87 is preferably set so that an energizing voltage of 10 millivolts is applied to the $A_0$ electrode whenever the feedback error signal is zero. At the same time, the idling biases for the variable gain amplifiers of the $A_1$ and $A_2$ feedback circuits are preferably set to provide an energizing voltage of 20 to 30 millivolts to each of the $A_1$ and $A_2$ electrodes for the case where their feedback error signals are of zero value. The precise values for the idling biases, particularly for the $A_1$ and $A_2$ feedback circuits, depends some what on the spacings between the electrodes. If the $A_1$ and $A_2$ electrodes are located at greater distances from the voltage monitoring electrodes, then their idling bias values should likewise be greater.

The low-pass filter represented by resistor 124 and condenser 125 is, in each case, proportioned so that the net feedback around the feedback loop will never exceed 90°. As a consequence, the feedback loop will not be subject to undesired oscillations.

Figure 8:
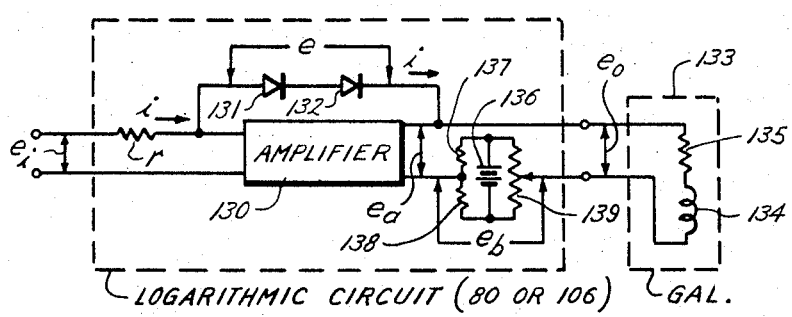
FIG. 8 shows in greater detail the construction of an individual one of the logarithmic circuits of FIG. 3.

Referring now to FIG. 8 of the drawings, there is shown in greater detail the manner of construction of one of the logarithmic circuits of FIG. 3. In FIG. 3, each of the logarithmic circuits 80 and 106 is of identical construction. This construction for a single one of these circuits is given in FIG. 8. The logarithmic circuit, as shown in FIG. 8, is similar to an operational amplifier type of circuit except that the usual linear feedback impedance has been replaced by one or more non-linear diodes. More particularly, the logarithmic circuit of FIG. 8 includes a high-gain amplifier 130 having a pair of silicon junction diodes 131 and 132 connected in series between the input and output of the amplifier to form a feedback path therebetween.

The linear input signal being supplied by the downhole exploring device is designated as $e_1$ and is supplied to the input of amplifier 130 by way of an input resistor $r$. The output of the amplifier 130 is connected to a galvanometer unit 133, which corresponds to either the galvanometer 41 or the galvanometer 42 of FIG. 3 depending on which of the FIG. 3 logarithmic circuits is being considered. The inductance of the galvanometer coil is represented by an inductor 134 while the galvanometer resistance is represented by a resistor 135.

A biasing circuit means is also connected in series between the output of the amplifier 130 and the galvanometer 133. This biasing circuit means includes a source of direct-current voltage represented by a battery 136, a pair of fixed resistors 137 and 138 and an adjustable potentiometer 139. These elements are connected in the form of a bridge circuit so that zero voltage will be introduced between the amplifier 130 and the galvanometer 133 when the sliding tap of potentiometer 139 is set at its center position. Adjustment of the sliding tap above or below this center position introduces positive and negative biasing voltages in series between the amplifier 130 and the galvanometer 133.

Figure 9:
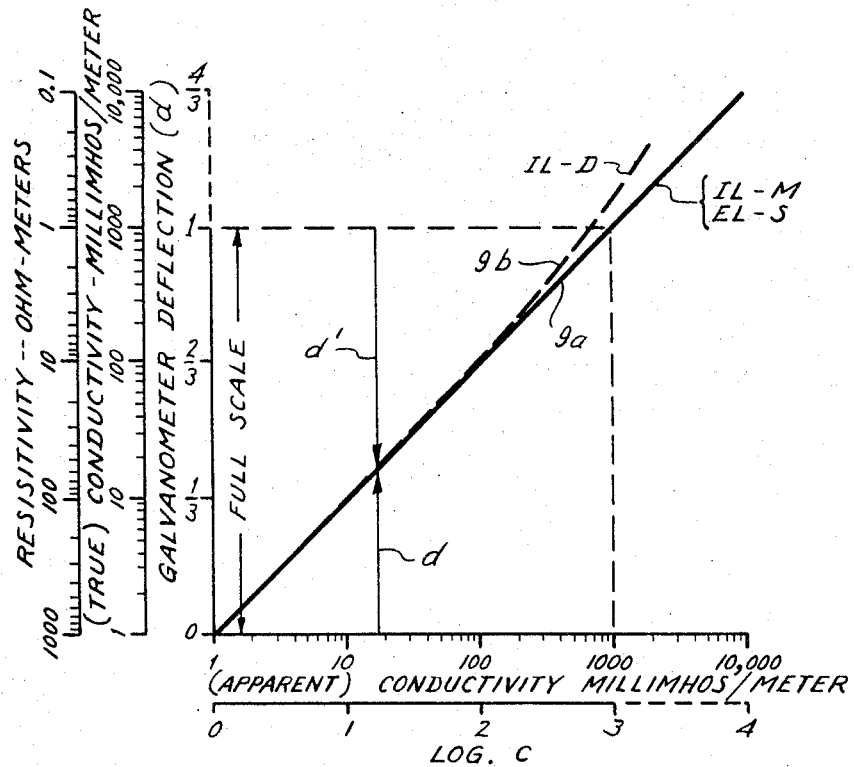
FIGS. 9 and 10 are graphs which are used in explaining the operation of the logarithmic circuit of FIG. 8.

The operation of the logarithmic circuit of FIG. 8, together with its cooperation with the galvanometer 133, will be explained with the aid of the graph of FIG. 9. In FIG. 9, the abscissa axis corresponds to values of the conductivity signal being supplied by the downhole exploring apparatus, expressed in terms of conductivity units, while the ordinate axis is calibrated in terms of the galvanometer deflection. Corresponding conductivity and resistivity calibrations are also given for the ordinate axis. The solid-line straight-line curve 9a of FIG. 9 represents the desired relationship for the borehole exploring devices whose output signals are linear in terms of conductivity. This is the case for the medium depth coil system and the shallow depth electrode system.

Where, as indicated in FIG. 9, it is desired that the full range of galvanometer deflection correspond to three complete logarithmic cycles, then the relationship between the galvanometer deflection $d$ and the conductivity value $c$ of the signal developed by the downhole exploring device is:

$$d = \tfrac{1}{3} \log C \tag{11}$$

The deflection $d$ is in terms of conductivity and, hence, is from right to left on the recorded log of FIG. 4. Deflection in the reverse direction, which is in terms of resistivity, is denoted in FIG. 9 by the dimension $d'$. As seen from FIG. 9:

$$d' = 1 - d \tag{12}$$

The relationship between conductivity expressed in millimhos per meter and resistivity expressed in ohm-meters is:

$$C = 1000/R \tag{13}$$

Substituting Equation 13 into Equation 11, substituting the results into Equation 12 and simplifying gives:

$$d' = \tfrac{1}{3} \log R \tag{14}$$

Thus, it is seen that the deflection $d'$ from one end of the scale range is logarithmic in terms of resistivity at the same time that the deflection $d$ from the other end of the scale range is logarithmic in terms of conductivity.

The relationship between the galvanometer deflection $d$ and the output voltage $e_o$ from the logarithmic circuit is:

$$d = e_o / E \tag{15}$$

where $E$ represents the voltage required for full scale deflection of the galvanometer. It is noted that the galvanometer proper is a linear device, the galvanometer deflection being directly proportional to the voltage supplied thereto.

The relationship between the electrical conductivity $C$ seen by the downhole exploring device and the input voltage $e_i$ which is supplied to the logarithmic circuit is:

$$C = e_i / K \tag{16}$$

where $K$ is a proportionality constant which depends on the physical construction of the exploring device and the system gain factor between the exploring device and the input of the logarithmic circuit. Equation 16 denotes that the input signal $e_i$ is directly proportional to the formation conductivity $C$.

Substituting Equations 15 and 16 into Equation 11 gives:

$$e_o = \tfrac{1}{3} E \log \frac{e_i}{K} \tag{17}$$

This represents the input-output signal transfer characteristic that is required of the logarithmic circuit if the relationship of Equation 11, which is the desired relationship depicted in FIG. 9, is to be satisfied.

Figure 10:
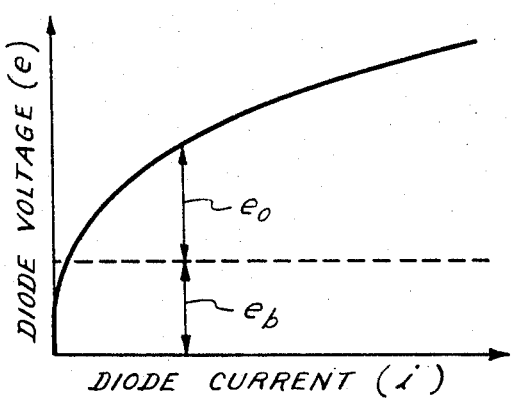

The voltage-current relationship for the two series-connected silicon junction diodes 131 and 132 of FIG. 8 is described by the expression:

$$e = m \log i - b \tag{18}$$

where $e$ represents the voltage drop across the two diodes, $i$ represents the current flowing through the diodes, and $m$ and $b$ are constants determined by the physical properties of the diodes. This voltage-current relationship is graphically indicated in FIG. 10 of the drawings. If both diodes have exactly the same characteristics, then each may be considered as contributing one-half of the diode voltage represented by Equation 18. In other words, the relationship for a single diode is the same as that of Equation 18 except that the righthand side of Equation 18 would need to be multiplied by a factor of one-half.

For the case of an operational amplifier type of circuit, the feedback action serves to maintain a net voltage difference of zero across the two input terminals of the amplifier 130. Consequently, the relationship between the input voltage $e_i$ and the current $i$ is:

$$i = e_i / r \tag{19}$$

where $r$ is the resistance value of the input resistor $r$. Also, the relationship between the voltage $e_a$ appearing across the output terminals of the amplifier 130 and the voltage drop across the diode elements in the feedback path is:

$$e_a = -e \tag{20}$$

The net voltage $e_o$ to the galvanometer 133 also includes the biasing voltage $e_b$ introduced by the biasing network. Consequently, $$e_o = e_a + e_b \tag{21}$$

Substituting Equations 18, 19 and 20 into Equation 21 and simplifying gives:

$$e_o = -m \log \frac{e_i}{r} + b + e_b \tag{22}$$

Equation 22 represents the actual input-output characteristic of the logarithmic circuit of FIG. 8.

In order to make the actual characteristic agree with the desired characteristic, it is necessary to adjust the biasing voltage $e_b$ so that the net output voltage $e_o$ to the galvanometer is equal to zero when the conductivity value $C$ is equal to unity. When $C$ is unity, the input voltage $e_i$ is equal to $K$. Inserting these desired boundary conditions into Equation 22 and solving for $e_b$ gives:

$$e_b = m \log \frac{K}{r} - b \tag{23}$$

With $e_b$ set to satisfy these boundary conditions, Equation 23 may be substituted into Equation 22 which, upon simplification, gives:

$$e_o = -m \log \frac{e_i}{K} \tag{24}$$

This is the actual input-output characteristic for the logarithmic circuit of FIG. 8 when the biasing voltage is set at the proper value.

Comparing the actual characteristic of Equation 24 with the desired characteristic of Equation 17, it is seen that these characteristics are the same except for the constant multipliers in front of the logarithmic terms. These constant multipliers $\tfrac{1}{3} E$ and $m$ denote the volts per decade factors of the galvanometer and the diodes, respectively. These factors are selected so that they are equal to one another. Adjustment of the volts per decade factor of the galvanometer is obtained by changing the sensitivity of the galvanometer and, hence, the amount of voltage $E$ required for full scale deflection. The volts per decade factor $m$ for the diodes can be changed by proper selection of the particular diodes which are used and by proper selection of the number of diodes which are used.

The negative sign in Equation 24 indicates a negative polarity for the output signal $e_o$ relative to the input signal $e_i$. This is taken into account by connecting the output terminals of the logarithmic circuit to the galvanometer with the appropriate polarity for causing galvanometer deflection in the proper direction.

It is briefly noted that, if desired, a mechanical biasing can be used in place of the electrical biasing provided by the biasing network of the logarithmic circuit. This is done by mechanically adjusting the galvanometer so that its zero or "at rest" position is at an appropriate off-scale position with respect to the recording scale.

Figure 11:
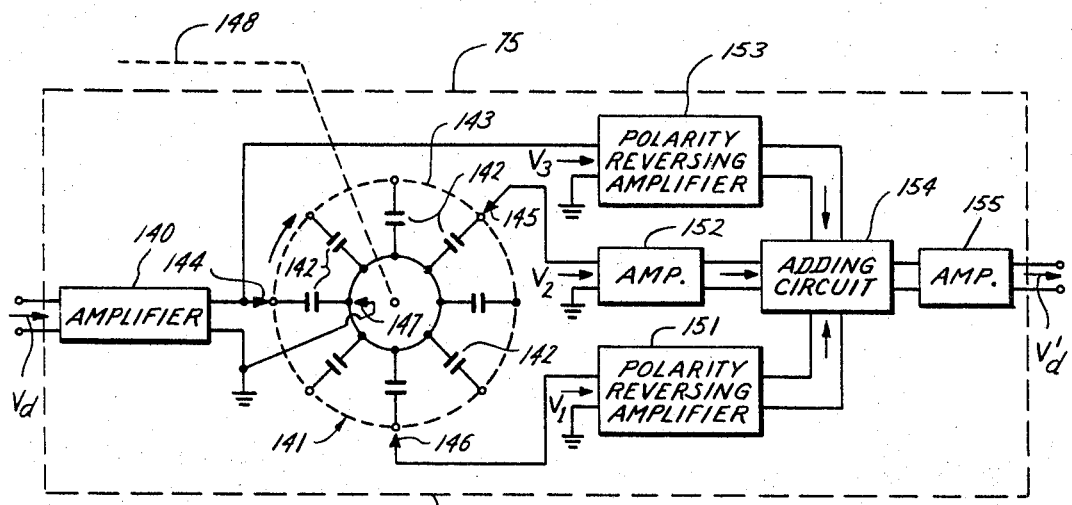
FIG. 11 shows in greater detail the construction of the computer of FIG. 3.

Referring now to FIG. 11 of the drawings, there is shown in greater detail the manner of construction of the computer 75 of FIG. 3. As shown in FIG. 11, the conductivity signal $V_d$ from the IL–D deep zone coil system is supplied by way of an amplifier 140 to a signal memory system 141. The purpose of the memory system 141 is to store the signal obtained at one depth in the borehole and then to supply it to an output circuit when the downhole coil system is at another depth in the borehole. To this end, the memory system 141 includes a plurality of storage condensers 142 which are mounted on a drum of non-conductive material 143. A plurality of stationary electrical contact brushes 144, 145 and 146 are positioned around the periphery of the drum 143 so as to contact the terminals for successive ones of these storage condensers 142 as the drum 143 is rotated. A common contact brush 147 is used to provide a ground connection for the other terminals of the storage condensers 142.

In operation, the drum 143 is rotated in synchronism with the movement of the coil system through the borehole by means of a suitable drive linkage with the measuring wheel 58 shown in FIG. 1. This drive linkage is represented schematically by dash line 148. This drive linkage is geared so that a given storage condenser 142 will move from the contact brush 144 to the contact brush 145 when the coil system moves a distance of 80 inches in the borehole. The third contact brush 146 is located a corresponding distance from the second brush 145 so that 80 inches of borehole movement is also required to move a storage condenser 142 from the brush 145 to the brush 146. The number of storage condensers 142 which are used will usually be appreciably greater than the number shown in the schematic representation of FIG. 11. Also, a multi-pole, multi-contact stepping switch or stepping relay may be used in place of the rotating drum arrangement shown in FIG. 11. It is, however, easier to visualize the operation when it is described in terms of a rotating drum.

The three signals obtained from the three stationary contact brushes 146, 145 and 144 are designated as $V_1$, $V_2$ and $V_3$, respectively. They are individually supplied to respective ones of amplifiers 151, 152 and 153. The outputs of these amplifiers are connected to a common signal adding circuit 154. Amplifiers 151 and 153 are constructed to provide output signals having a polarity opposite to the polarity of the output signal provided by the amplifier 152. The adding circuit 154 serves to algebraically add or combine these three signals to develop a net output signal which is supplied by way of an output amplifier 155 to provide the computed signal $V_d'$.

The relationship between this computed signal $V_d'$ and the three original signals $V_1$, $V_2$ and $V_3$ is described by the expression:

$$V_d' = -\theta_1 V_1 + \theta_2 V_2 - \theta_3 V_3 \qquad (25)$$

where $\theta_d'$, $\theta_2$ and $\theta_3$ are weighting factors which describe the fractional amounts of the original signs which are used to provide the computed signal $V_d'$.

In terms of the borehole environment, the $V_1$ signal represents a conductivity measurement made at a first depth in the borehole, the $V_2$ signal represents a conductivity measurement made at a location 80 inches above the $V_1$ depth and the $V_3$ signal represents a conductivity measurement made 80 inches above the $V_2$ depth. The middle or $V_2$ depth is taken as being the main depth of interest at this particular instant. The $V_1$ and $V_3$ signals, therefore, represent signals obtained from formation regions above and below the middle $V_2$ position. In order to obtain a signal for the middle $V_2$ position having sharper vertical resolution, it is desired to remove from the $V_2$ signal the components thereof which were contributed by the lower and upper $V_1$ and $V_3$ regions. This is done by subtracting the appropriate fractions of the signals obtained at the $V_1$ and $V_3$ levels from the $V_2$ signal. This subtraction is performed in the adding circuit 154. The $\theta_1$, $\theta_2$ and $\theta_3$ weighting factors are provided by properly constructing the amplifiers 151, 152 and 153 and the adding circuit 154 to apply the appropriate gain or attenuation factors to the individual signals. Coil system computers of this type are described in greater detail in co-pending application Ser. No. 807,221, filed on Apr. 17, 1959 in the name of H. G. Doll.

Figure 12:
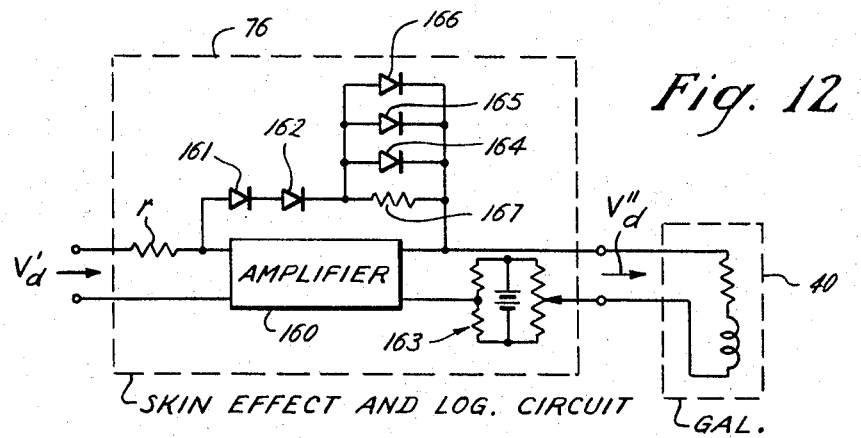
FIG. 12 shows in greater detail the construction of the skin effect and logarithmic circuit of FIG. 3.

Referring now to FIG. 12 of the drawings, there is shown in greater detain the manner of construction of the skin effect and logarithmic circuit 76 of FIG. 3. A first function of the circuit 76 is to convert the incoming signal $V_d'$ to a signal which is proportional to the logarithm thereof. To this end, the circuit 76 includes a high-gain amplifier 160, an input resistor $r$, a pair of series-connected feedback diodes 161 and 162 and a biasing circuit means 163. These elements are similar to the elements already considered in connection with the logarithmic circuit of FIG. 8 and function in a similar manner to provide an output signal $V_d''$ which is proportional to the logarithm of the input signal $V_d'$.

Figure 13:
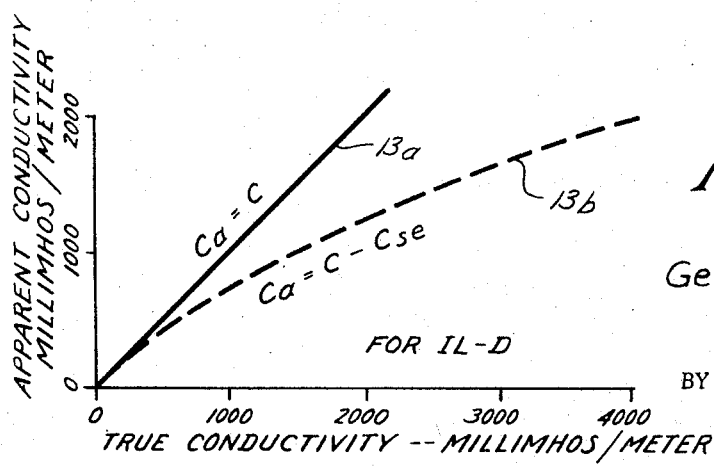
FIG. 13 is a graph used in explaining the operation of the skin effect and logarithmic circuit of FIG. 12.

A second function of the circuit 76 is to correct the conductivity signal for signal losses caused by the occurrence of electrical skin effect in the formation material being investigated. The nature of this electrical skin effect is indicated graphically in FIG. 13. The abscissa axis of the graph of FIG. 13 is plotted in terms of the true formation conductivity while the ordinate axis is plotted in terms of the apparent conductivity value indicated by the conductivity signal developed by the downhole coil system. If the true and apparent conductivities were the same, then the relationship would be represented by the straight line 13a of FIG. 13 which is of unity slope. The occurrence of electrical skin effect phenomena, however, causes the relationship to be as indicated by the dash line curve 13b of FIG. 13. A comparison of curves 13b and 13a shows that the skin effect operates to reduce the apparent conductivity signal to a value less than its correct value. This relationship can be described by the mathematical expression:

$$C_a = C - C_{se} \qquad (26)$$

where $C$ is the true conductivity, $C_{se}$ is the conductivity error caused by skin effect and $C_a$ is the resulting apparent conductivity which is indicated by the output signal from the downhole coil system. The relationship represented by curve 13b of FIG. 13 is also plotted on the graph of FIG. 9 as curve 9b.

It has been determined both theoretically and experimentally, for the case of a homogeneous medium, that to a good approximation:

$$C_{se} \cong k' C^{3/2} \qquad (27)$$

where $k'$ is a proportionality constant. Thus, the magnitude of the skin effect error increases as the true formation conductivity increases.

In order to compensate for this signal loss caused by skin effect, it is necessary to boost the magnitude of the apparent conductivity signal by an amount sufficient to make up for this loss. This is done with the skin effect and logarithmic circuit 76 of FIG. 12 by increasing the volts per decade factor of the logarithmic circuit as the magnitude of the signal supplied by the downhole coil system increases. This operation is provided by the use of a plurality of additional diodes 164, 165 and 166 which are all connected in parallel across a resistor 167 which is connected in series in the feedback path of the amplifier 160.

At very low signal levels, the additional diodes 164–166 are essentially non-conductive and the logarithmic circuit operates in the manner previously considered to provide the necessary logarithmic conversion. As the incoming signal $V_d'$ increases, the current flow through the feedback path formed by diodes 161, 162 and resistor 167 increases. As a consequence, the voltage drop across resistor 167 increases. This causes the additional diodes 164–166 to become more and more conductive. As a consequence, more and more of the feedback current which would otherwise pass through the resistor 167 begins to pass through the additional diodes 164–166. In effect, this is the same as placing more and more diodes in series with the two original diodes 161 and 162. This, in turn, increases the volts per decade factor for the feedback path since, for a given current, increasing the number of diodes increases the total voltage drop across the feedback path. This is accompanied by a corresponding increase in the output voltage supplied to the galvanometer 40.

The proper rate of increase of the volts per decade factor is obtained by proper selection of the resistance value of resistor 167 and the number of the additional diodes which are placed in parallel thereacross. These parameters will be somewhat different for different types of coil systems since different types of coil systems are affected in differing degrees by the electrical skin effect.

From the foregoing descriptions of the various features of the present invention, it is seen that borehole investigating apparatus constructed in accordance with the present invention provides a greater number of accurately focussed measurements of selected formation regions than has been heretofore possible to obtain with a single piece of apparatus. In addition, the manner in which the particular formation regions have been selected and the manner in which the measurements are displayed on the recorded log considerably simplify the interpretation of the log and enable more reliable determinations of the character of the subsurface formation fluids in a more efficient and less time-consuming manner.

While there has been described what is at present considered to be a preferred embodiment of this invention, it will be obvious to those skilled in the art that various changes and modifications may be made therein without departing from the invention and it is, therefore, intended to cover all such changes and modifications as fall within the true spirit of the invention.

What is claimed is:

1. A method of investigating earth formations traversed by a borehole containing a drilling fluid comprising: measuring the electrical resistance of the formation material at a first lateral distance from the borehole by means of a first focussed coil system which is predominantly responsive to formation material at this first lateral distance; measuring the electrical resistance of the formation material at a second lateral distance from the borehole by means of a second focussed coil system which is predominantly responsive to formation material at this second lateral distance; converting these measurements to measurements which are proportional to the logarithms thereof; and recording the logarithmic measurements relating to the measurements derived from the first and second coil systems with respect to related scales having a common reference point on the same portion of a common recording medium as a function of borehole depth.

2. A method of investigating earth formations traversed by a borehole comprising: inducing in the earth formation material a flow of alternating current which is generally coaxial with the borehole; obtaining a first indication which is primarily representative of the induced current flowing at a first lateral distance from the borehole; obtaining a second indication which is primarily representative of the induced current flowing at a second lateral distance from the borehole; converting these indications to indications which are proportional to the logarithms thereof; and recording the logarithmic indications to a common scale on the same portion of a common recording medium as a function of borehole depth whereby the separation between said two recorded indications will be related to the ratio of said first and second indications to one another.

3. A method of determining the water saturation of permeable subsurface earth formations traversed by a borehole comprising: measuring the electrical resistance of the formation material immediately adjacent the borehole by means of a shallow-penetration electrode system; measuring the electrical resistance of the formation material which is relatively far removed from the borehole by means of a coil system which is primarily responsive to such formation material; converting these measurements to measurements which are proportional to the logarithms thereof; and recording the logarithmic measurements to a common scale on the same portion of a common recording medium as a function of borehole depth whereby the separation between the two recorded measurements is indicative of said water saturation.

4. A method of determining the water saturation of permeable subsurface earth formations traversed by a borehole containing a drilling fluid comprising: measuring the electrical resistance of the formation material immediately adjacent the borehole by means of a shallow-penetration electrode system; measuring the electrical resistance of the formation material which is relatively far removed from the borehole by means of a coil system which is primarily responsive to such formation material; converting these measurements to measurements which are proportional to the logarithms thereof; recording the logarithmic measurements relating to the measurements derived from the electrode and coil systems with respect to related scales having a common reference point on a first portion of a common recording medium as a function of borehole depth; measuring the naturally occurring spontaneous earth potential existing in the fluid-filled borehole; and recording the spontaneous potential measurements on an adjacent portion of the common recording medium as a function of borehole depth.

5. A method of obtaining an improved indication of the nature of subsurface earth formations traversed by a borehole comprising: measuring the electrical resistance of the formation material at a first lateral distance from the borehole by means of a shallow-penetration electrode system; measuring the electrical resistance of the formation material at a second lateral distance from the borehole by means of a first focussed coil system which is predominantly responsive to formation material at this second lateral distance; measuring the electrical resistance of the formation material at a third lateral distance from the borehole by means of a second focussed coil system which is predominantly responsive to formation material at this third lateral distance; converting these measurements to measurements which are proportional to the logarithms thereof; and recording the logarithmic measurements on a common recording medium as a function of borehole depth.

6. A method of obtaining an improved indication of the nature of subsurface earth formations traversed by a borehole containing a drilling fluid comprising: measuring the electrical resistance of the formation material at a first lateral distance from the borehole by means of a focussed shallow-penetration electrode system; measuring the electrical resistance of the formation material at a second lateral distance from the borehole by means of a first focussed coil system which is predominantly responsive to formation material at this second lateral distance; measuring the electrical resistance of the formation material at a third lateral distance from the borehole by means of a second focussed coil system which is predominantly responsive to formation material at this third lateral distance; converting these measurements to measurements which are proportional to the logarithms thereof; recording the logarithmic measurements on a first portion of a common recording medium as a function of borehole depth; measuring the naturally-occurring spontaneous earth potential existing in the fluid-filled borehole; and recording the spontaneous potential measurements on an adjacent portion of the common recording medium as a function of borehole depth.

7. In apparatus for investigating earth formations traversed by a borehole, the combination comprising: an elongated housing means adapted for movement through the borehole; a plurality of transmitter coils mounted within the housing means and including a primary transmitter coil having a greater number of turns than any other transmitter coil; first supply circuit means for supplying energizing current of predetermined frequency to the transmitter coils, this supply circuit means interconnecting the transmitter coils with at least one transmitter coil being connected in a series-opposing manner with respect to another transmitter coil; a first plurality of receiver coils mounted within the housing means and including a primary receiver coil having a greater number of turns than any other of these receiver coils; first output circiut means interconnecting the first receiver coils with at least one receiver coil being connected in a series-opposing manner with respect to another receiver coil; the first receiver coils being longitudinally positioned within the housing means relative to the transmitter coils so that the net relative sensitivity of all the transmitter-receiver coil pairs having a separation distance greater than the separation distance of the coil pair formed by the primary transmitter and receiver coils is of the same polarity as the relative sensitivity of this primary coil pair; a second plurality of receiver coils mounted within the housing means and including a primary receiver coil having a greater number of turns than any other of these second receiver coils; second output circuit means interconnecting the second receiver coils with at least one receiver coil being connected in a series-opposing manner with respect to another receiver coil; the second receiver coils being longitudinally positioned relative to the transmitter coils so that the net relative sensitivity of all the resulting transmitter and second receiver coil pairs having a separation distance greater than the separation distance of the coil pair formed by the primary transmitter coil and the second primary receiver coil is of opposite polarity to the relative sensitivity of this second primary coil pair; first and second phase selective circuit means individually coupled to the first and second output circuit means for providing the first and second electrical signals individually representative of the net signal components of a predetermined phase which are induced in the two sets of receiver coils; mutual impedance means coupled between the first and second output circuit means for minimizing signal components developed in either set of receiver coils as a result of its mutual coupling with the other set of receiver coils; an electrode system secured to the exterior of the housing means and including a survey current electrode and at least one focussing current electrode; second supply circuit means for supplying an alternating current signal having a frequency different from the predetermined frequency of the transmitter coil current; first and second variable gain amplifier circuit means having their inputs coupled to the second supply circuit means and their outputs coupled to different ones of the survey and focussing electrodes; first detector circuit means for developing a direct current signal representative of a voltage difference intermediate the survey and focussing electrodes and for supplying this signal to one of the variable gain amplifier circuit means for adjusting the gain thereof so as to minimize this voltage difference; second detector circuit means for developing a direct current signal representative of any departure from a predetermined value of the voltage difference between a point intermediate the survey and focussing electrodes and a reference point outside such intermediate region and for supplying this direct current signal to the other of the variable gain amplifier circuit means for adjusting the gain thereof so as to minimize this departure; electrode system output circuit means for providing an electrical signal representative of the magnitude of the current emitted by the survey current electrode; circuit means coupled to the first and second phase selective circuit means and to the electrode system output circuit means for converting each of the signals provided by these circuit means to signals which are proportional to the logarithms thereof; and recording means for recording the logarithmic signals on a common recording medium as a function of borehole depth.

8. In apparatus for investigating earth formations traversed by a borehole, the combination comprising: an elongated housing means adapted for movement through the borehole; a plurality of transmitter coils mounted within the housing means and including a primary transmitter coil having a greater number of turns than any other transmitter coil; first supply circuit means for supplying energizing current of predetermined frequency to the transmitter coils; this supply circuit means interconnecting the transmitter coils with at least one transmitter coil being connected in a series-opposing manner which respect to another transmitter coil; a first plurality of receiver coils mounted within the housing means and including a primary receiver coil having a greater number of turns than any other of these receiver coils; first output circuit means interconnecting the first receiver coils with at least one receiver coil being connected in a series-opposing manner with respect to another receiver coil; the first receiver coils being longitudinally positioned within the housing means relative to the transmitter coils so that the net relative sensitivity of all the transmitter-receiver coil pairs having a separation distance greater than the separation distance of the coil pair formed by the primary transmitter and receiver coils is of the same polarity as the relative sensitivity of this primary coil pair; a second plurality of receiver coils mounted within the housing means and including a primary receiver coil having a greater number of turns than any other of these second receiver coils; second output circuit means interconnecting the second receiver coils with at least one receiver coil being connected in a series-opposing manner with respect to another receiver coil; the second receiver coils being longitudinally positioned relative to the transmitter coils so that the net relative sensitivity of all the resulting transmitter and second receiver coil pairs having a separation distance greater than the separation distance of the coil pair formed by the primary transmitter coil and the second primary receiver coil is of opposite polarity to the relative sensitivity of this second primary coil pair; first and second phase selective circuit means individually coupled to the first and second output circuit means for providing first and second electrical signals individually representative of the net signal components of a predetermined phase which are induced in the two sets of receiver coils; an electrode system secured to the exterior of the housing means and including a survey current electrode and at least one focussing current electrode; second supply circuit means for supplying an alternating current signal having a frequency different from the predetermined frequency of the transmitter coil current; first and second variable gain amplifier circuit means having their inputs coupled to the second supply circuit means and their outputs coupled to different ones of the survey and focussing electrodes; first detector circuit means for developing a direct current signal representative of a voltage difference intermediate the survey and focussing electrodes and for supplying this signal to one of the variable gain amplifier circuit means for adjusting the gain thereof so as to minimize this voltage difference; second detector circuit means for developing a direct current signal representative of any departure from a predetermined value of the voltage difference between a point intermediate the survey and focussing electrodes and a reference point outside such intermediate region and for supplying this direct current signal to the other of the variable gain amplifier circuit means for adjusting the gain thereof so as to minimize this departure; electrode system output circuit means for providing an electrical signal representative of the magnitude of the current emitted by the survey current electrode; circuit means coupled to the first and second phase selective circuit means and to the electrode system output circuit means for converting each of the signals provided by these circuit means to signals which are proportional to the logarithms thereof; and recording means for recording the logarithmic signals on a common recording medium as a function of borehole depth.

9. In apparatus for investigating earth formations traversed by a borehole, the combination comprising: an elongated housing means adapted for movement through the borehole; a plurality of transmitter coils mounted within the housing means and including a primary transmitter coil having a greater number of turns than any other transmitter coil; first supply circuit means for supplying energizing current of predetermined frequency to the transmitter coils, this supply circuit means interconnecting the transmitter coils with at least one transmitter coil being connected in a series-opposing manner with respect to another transmitter coil; a first plurality of receiver coils mounted within the housing means and including a primary receiver coil having a greater number of turns than any other of these receiver coils; first output circuit means interconnecting the first receiver coils with at least one receiver coil being connected in a series-opposing manner with respect to another receiver coil; the first receiver coils being longitudinally positioned within the housing means relative to the transmitter coils so that the net relative sensitivity of all the transmitter-receiver coil pairs having a separation distance greater than the separation distance of the coil pair formed by the primary transmitter and receiver coils is of the same polarity as the relative sensitivity of this primary coil pair; a second plurality of receiver coils mounted within the housing means and including a primary receiver coil having a greater number of turns than any other of these second receiver coils; second output circuit means interconnecting the second receiver coils with at least one receiver coil being connected in a series-opposing manner with respect to another receiver coil; the second receiver coils being longitudinally positioned relative to the transmitter coils so that the net relative sensitivity of all the resulting transmitter and second receiver coil pairs having a separation distance greater than the separation distance of the coil pair formed by the primary transmitter coil and the second primary receiver coil is of opposite polarity to the relative sensitivity of this second primary coil pair; first and second phase selective circuit means individually coupled to the first and second output circuit means for providing first and second electrical signals individually representative of the net signal components of a predetermined phase which are induced in the two sets of receiver coils; mutual impedance means coupled between the first and second output circuit means for minimizing signal components developed in either set of receiver coils as a result of its mutual coupling with the oth set of receiver coils; an electrode system secured to the exterior of the housing means and including a survey current electrode and at least one focussing current electrode; second supply circuit means for supplying an alternating current signal having a frequency different from the predetermined frequency of the transmitter coil current; first and second variable gain amplifier circuit means having their inputs coupled to the second supply circuit means and their outputs coupled to different ones of the survey and focussing electrodes; first detector circuit means for developing a direct current signal representative of a voltage difference intermediate the survey and focussing electrodes and for supplying this signal to one of the variable gain amplifier circuit means for adjusting the gain thereof so as to minimize this voltage difference; second detector circuit means for developing a direct current signal representative of any departure from a predetermined value of the voltage difference between a point intermediate the survey and focussing electrodes and a reference point outside such intermediate region and for supplying this direct current signal to the other of the variable gain amplifier circuit means for adjusting the gain thereof so as to minimize this departure; electrode system output circuit means for providing an electrical signal representative of the magnitude of the current emitted by the survey current electrode; and recording means for recording the electrical signals provided by the first and second phase selective circuit means and the electrode system output circuit means on a common recording medium as a function of borehole depth.

10. In apparatus for investigating earth formations traversed by a borehole, the combination comprising: an elongated housing means adapted for movement through the borehole; a plurality of transmitter coils mounted within the housing means and including a primary transmitter coil having a greater number of turns than any other transmitter coil; first supply circuit means for supplying energizing current of predetermined frequency to the transmitter coils; this supply circuit means interconnecting the transmitter coils with at least one transmitter coil being connected in a series-opposing manner with respect to another transmitter coil; a first plurality of receiver coils mounted within the housing means and including a primary receiver coil having a greater number of turns than any other of these receiver coils; first output circuit means interconnecting the first receiver coils with at least one receiver coil being connected in a series-opposing manner with respect to another receiver coil; the first receiver coils being longitudinally positioned within the housing means relative to the transmitter coils so that the net relative sensitivity of all the transmiter-receiver coil pairs having a separation distance greater than the separation distance of the coil pair formed by the primary transmitter and receiver coils is of the same polarity as the relative sensitivity of this primary coil pair; a second plurality of receiver coils mounted within the housing means and including a primary receiver coil having a greater number of turns than any other of these second receiver coils; second output circuit means interconnecting the second receiver coils with at least one receiver coil being connected in a series-opposing manner with respect to another receiver coil; the second receiver coils being longitudinally positioned relative to the transmitter coils so that the net relative sensitivity of all the resulting transmitter and second receiver coil pairs having a separation distance greater than the separation distance of the coil pair formed by the primary transmitter coil and the second primary receiver coil is of opposite polarity to the relative sensitivity of this second primary coil pair; first and second phase selective circuit means individually coupled to the first and second output circuit means for providing first and second electrical signals individually representative of the net signal components of a predetermined phase which are induced in the two sets of receiver coils; an electrode system secured to the exterior of the housing means and including a survey current electrode and at least one focussing current electrode; second supply circuit means for supplying an alternating current signal having a frequency different from the predetermined frequency of the transmitter coil current; first and second variable gain amplifier circuit means having their inputs coupled to the second supply circuit means and their outputs coupled to different ones of the survey and focussing electrodes; first detector circuit means for developing a direct current signal representative of a voltage difference intermediate the survey and focussing electrodes and for supplying this signal to one of the variable gain amplifier circuit means for adjusting the gain thereof so as to minimize this voltage difference; second detector circuit means for developing a direct current signal representative of any departure from a predetermined value of the voltage difference between a point intermediate the survey and focussing electrodes and a reference point outside such intermediate region and for supplying this direct current signal to the other of the variable gain amplifier circuit means for adjusting the gain thereof so as to minimize this departure; electrode system output circuit means for providing an electrical signal representative of the magnitude of the current emitted by the survey current electrode; and recording means for recording the electrical signals provided by the first and second phase selective circuit means and the electrode system output circuit means on a common recording medium as a function of borehole depth.

11. In apparatus for investigating earth formations traversed by a borehole, the combination comprising: an elongated housing means adapted for movement through the borehole; a plurality of transmitter coils mounted within the housing means and including a primary transmitter coil having a greater number of turns than any other transmitter coil; first supply circuit means for supplying energizing current of predetermined frequency to the transmitter coils, this supply circuit means interconnecting the transmitter coils with at least one transmitter coil being connected in a series-opposing manner with respect to another transmitter coil; a first plurality of receiver coils mounted within the housing means and including a primary receiver coil having a greater number of turns than any other of these receiver coils; first output circuit means interconnecting the first receiver coils with at least one receiver coil being connected in a series-opposing manner with respect to another receiver coil; a second plurality of receiver coils mounted within the housing means and including a primary receiver coil having a greater number of turns than any other of these second receiver coils; second output circuit means interconnecting the second receiver coils with at least one receiver coil being connected in a series-opposing manner with respect to another receiver coil; first and second phase selective circuit means individually coupled to the first and second output circuit means for providing first and second electrical signals individually representative of the net signal components of a predetermined phase which are induced in the two sets of receiver coils; mutual impedance means coupled between the first and second output circuit means for minimizing signal components developed in either set of receiver coils as a result of its mutual coupling with the other set of receiver coils; an electrode system secured to the exterior of the housing means and including a survey current electrode and at least one focussing current electrode; second supply circuit means for supplying an alternating current signal having a frequency different from the predetermined frequency of the transmitter coil current; first and second variable gain amplifier circuit means having their inputs coupled to the second supply circuit means and their outputs coupled to different ones of the survey and focussing electrodes; first detector circuit means for developing a direct current signal representative of a voltage difference intermediate the survey and focussing electrodes and for supplying this signal to one of the variable gain amplifier circuit means for adjusting the gain thereof so as to minimize this voltage difference; second detector circuit means for developing a direct current signal representative of any departure from a predetermined value of the voltage difference between a point intermediate the survey and focussing electrodes and a reference point outside such intermediate region and for supplying this direct current signal to the other of the variable gain amplifier circuit means for adjusting the gain thereof so as to minimize this departure; electrode system output circuit means for providing an electrical signal representative of the magnitude of the current emitted by the survey current electrode; circuit means coupled to the first and second phase selective circuit means and to the electrode system output circuit means for converting each of the signals provided by these circuit means to signals which are proportional to the logarithms thereof; and recording means for recording the logarithmic signals on a common recording medium as a function of borehole depth.

12. In apparatus for investigating earth formations traversed by a borehole, the combination comprising: an elongated housing means adapted for movement through the borehole; a plurality of transmitter coils mounted within the housing means and including a primary transmitter coil having a greater number of turns than any other transmitter coil; first supply circuit means for supplying energizing current of predetermined frequency to the transmitter coils, this supply circuit means interconnecting the transmitter coils with at least one transmitter coil being connected in a series-opposing manner with respect to another transmitter coil; a first plurality of receiver coils mounted within the housing means and including a primary receiver coil having a greater number of turns than any other of these receiver coils; first output circuit means interconnecting the first receiver coils with at least one receiver coil being connected in a series-opposing manner with respect to another receiver coil; a second plurality of receiver coils mounted within the housing means and including a primary receiver coil having a greater number of turns than any other of these second receiver coils; second output circuit means interconnecting the second receiver coils with at least one receiver coil being connected in a series-opposing manner with respect to another receiver coil; first and second phase selective circuit means individually coupled to the first and second output circuit means for providing first and second electrical signals individually representative of the net signal components of a predetermined phase which are induced in the two sets of receiver coils; mutual impedance means coupled between the first and second output circuit means for minimizing signal components developed in either set of receiver coils as a result of its mutual coupling with the other set of receiver coils; an electrode system secured to the exterior of the housing means and including a survey current electrode and at least one focussing current electrode; second supply circuit means for supplying an alternating current signal having a frequency different from the predetermined frequency of the transmitter coil current; first and second variable gain amplifier circuit means having their inputs coupled to the second supply circuit means and their outputs coupled to different ones of the survey and focussing electrodes; first detector circuit means for developing a direct current signal representative of a voltage difference intermediate the survery and focussing electrodes and for supplying this signal to one of the variable gain amplifier circuit means for adjusting the gain thereof so as to minimize this voltage difference; second detector circuit means for developing a direct current signal representative of any departure from a predetermined value of the voltage difference between a point intermediate the survey and focussing electrodes and a reference point outside such intermediate region and for supplying this direct current signal to the other of the variable gain amplifier circuit means for adjusting the gain thereof so as to minimize this departure; electrode system output circuit means for providing an electrical signal representative of the magnitude of the current emitted by the survey current electrode; and recording means for recording the electrical signal provided by the first and second phase selective circuit means and the electrode system output circuit means on a common recording medium as a function of borehole depth.

13. In apparatus for investigating earth formations traversed by a borehole, the combination comprising: an elongated support member adapted for movement through the borehole; a plurality of transmitter coils secured to the support member and including a primary transmitter coil having a greater number of turns than any other transmitter coil; supply circuit means for supplying energizing current to the transmitter coils, this supply circuit means interconnecting the transmitter coils with at least one transmitter coil being connected in a series-opposing manner with respect to another transmitter coil; a first plurality of receiver coils secured to the support member and including a primary receiver coil having a greater number of turns than any other of these receiver coils; first output circuit means interconnecting the first receiver coils with at least one receiver coil being connected in a series-opposing manner with respect to another receiver coil; the first receiver coils being longitudinally positioned along the support member relative to the transmitter coils so that the net relative sensitivity of all the transmitter-receiver coil pairs having a separation distance greater than the separation distance of the coil pair formed by the primary transmitter and receiver coils is of the same polarity as the relative sensitivity of this primary coil pair; a second plurality of receiver coils secured to the support member and including a primary receiver coil having a greater number of turns than any other of these second receiver coils; second output circuit means interconnecting the second receiver coils with at least one receiver coil being connected in a series-opposing manner with respect to another receiver coil; the second receiver coils being longitudinally positioned relative to the transmitter coils so that the net relative sensitivity of all the resulting transmitter and second receiver coil pairs having a separation distance greater than the separation distance of the coil pair formed by the primary transmitter coil and the second primary receiver coil is of opposite polarity to the relative sensitivity of this second primary coil pair; first and second phase selective circuit means individually coupled to the first and second output circuit means for providing first and second electrical signals individually representative of the net signal components of a predetermined phase which are induced in the two sets of receiver coils; mutual impedance means coupled between the first and second output circuit means for minimizing signal components developed in either set of receiver coils as a result of its mutual coupling with the other set of receiver coils; and recording means for recording the electrical signals provided by the first and second phase selective circuit means on a common recording medium as a function of borehole depth.

14. In apparatus for investigating earth formations traversed by a borehole, the combination comprising: an elongated support member adapted for movement through the borehole; a set of electrically interconnected transmitter coils secured to the support member and including a primary transmitter coil and at least one focussing transmitter coil; a first set of electrically interconnected receiver coils secured to the support member and including a primary receiver coil and at least one focussing receiver coil for providing an indication of an electrical characteristic of the formation material at a first lateral distance from the support member, the primary receiver coil being longitudinally spaced apart from the primary transmitter coil towards one end of the support member; a second set of electrically interconnected receiver coils secured to the support member and including a primary receiver coil and at least one focussing receiver coil for providing an indication of an electrical characteristic of the formation material at a second lateral distance from the support member, the primary receiver coil being longitudinally spaced apart from the primary transmitter coil towards the other end of the support member; circuit means for supplying energizing current to the transmitter coils; and means for providing separate indications of the signals induced in the two sets of receiver coils by currents flowing in the adjacent earth formations.

15. In apparatus for investigating earth formations traversed by a borehole, the combination comprising: an electrode system adapted for movement through the borehole and including a survey current electrode and at least one focussing current electrode; circuit means for supplying an alternating current signal; first and second variable gain amplifier circuit means having their inputs coupled to the supply circuit means and their outputs coupled to different ones of the survey and focussing electrodes; first detector circuit means for developing a direct current signal representative of a voltage difference intermediate the survey and focussing electrodes and for supplying this signal to one of the variable gain amplifier circuit means for adjusting the gain thereof so as to minimize this voltage difference; and second detector circuit means for developing a direct current signal representative of any departure from a predetermined value of the voltage difference between a point intermediate the survey and focussing electrodes and a reference point outside such intermediate region and for supplying this direct current signal to the other of the variable gain amplifier circuit means for adjusting the gain thereof so as to minimize this departure.

16. In apparatus for investigating earth formations traversed by a borehole, the combination comprising: an electrode system adapted for movement through the borehole and including a survey current electrode and at least one focussing current electrode; circuit means for supplying an alternating current signal; first and second variable gain amplifier circuit means having their inputs coupled to the supply circuit means and their outputs coupled to different ones of the survey and focussing electrodes; first and second biasing means for establishing predetermined idling values for the gain factors of corresponding ones of the variable gain amplifier circuit means; first detector circuit means for developing a direct current signal representative of a voltage difference intermediate the survey and focussing electrodes and for supplying this signal to one of the variable gain amplifier circuit means for adjusting the gain thereof so as to minimize this voltage difference; and second detector circuit means for developing a direct current signal representative of any departure from a predetermined value of the voltage difference between a point intermediate the survey and focussing electrodes and a reference point outside such intermediate region and for supplying this direct current signal to the other of the variable gain amplifier circuit means for adjusting the gain thereof so as to minimize this departure.

17. In apparatus for investigating earth formations traversed by a borehole, the combination comprising: an electrode system adapted for movement through the borehole and including a survey current electrode and at least one focussing current electrode; circuit means for supplying an alternating current signal; first and second variable gain amplifier circuit means having their inputs coupled to the supply circuit means and their outputs coupled respectively to the survey and focussing electrodes; first and second biasing means for establishing predetermined idling values for the gain factors of corresponding ones of the variable gain amplifier circuit means, the idling value for the first variable gain amplifier circuit means being set to apply a predetermined value of voltage to the survey current electrode and the idling value for the second variable gain amplifier circuit means being set to apply a voltage equal to at least twice the predetermined voltage value to the focussing current electrode; first detector circuit means for developing a direct current signal representative of a voltage difference intermediate the survey and focussing electrodes and for supplying this signal to the first variable gain amplifier circuit means for adjusting the gain thereof so as to minimize this voltage difference; and second detector circuit means for developing a direct current signal representative of any departure from the predetermined voltage value of the voltage difference between a point intermediate the survey and focussing electrodes and a reference point outside such intermediate region and for supplying this direct current signal to the second variable gain amplifier circuit means for adjusting the gain thereof so as to minimize this departure.

18. In apparatus for investigating earth formations traversed by a borehole, the combination comprising: an electrode system adapted for movement through the borehole and including a survey current electrode and upper and lower focussing current electrodes located respectively above and below the survey current electrode; circuit means for supplying an alternating current signal; first, second and third variable gain amplifier circuit means having their inputs coupled to the supply circuit means and their outputs coupled respectively to the survey, the upper focussing and the lower focussing electrodes; first detector circuit means for developing a direct current signal representative of a voltage difference intermediate the survey and at least one of the focussing electrodes and for supplying this signal to the first variable gain amplifier circuit means for adjusting the gain thereof so as to minimize this voltage difference; second detector circuit means for developing a direct current signal representative of any departure from a predetermined value of the voltage difference between a point intermediate the survey and upper focussing electrodes and a reference point outside such intermediate region and for supplying this direct current signal to the second variable gain amplifier circuit means for adjusting the gain thereof so as to minimize this departure; and third detector circuit means for developing a direct current signal representative of any departure from the predetermined value of the voltage difference between a point intermediate the survey and lower focussing electrodes and a reference point outside such intermediate region and for supplying this direct current signal to the third variable gain amplifier circuit means for adjusting the gain thereof so as to minimize this departure.

19. In apparatus for investigating earth formations traversed by a borehole, the combination comprising: an electrode system adapted for movement through the borehole and including a survey current electrode, at least one focussing current electrode and a pair of voltage monitoring electrodes located therebetween; circuit means for supplying an alternating current signal; first and second variable gain amplifier circuit means having their inputs coupled to the supply circuit means and their outputs coupled to different ones of the survey and focussing electrodes; first detector circuit means coupled to the pair of voltage monitoring electrodes for developing a direct current signal representative of the voltage difference therebetween and for supplying this signal to one of the variable gain amplifier circuit means for adjusting the gain thereof so as to minimize this voltage difference; and second detector circuit means coupled to at least one of the voltage monitoring electrodes for developing a direct current signal representative of any departure from a predetermined value of the voltage difference between a point adjacent this voltage monitoring electrode and a reference point outside the region intermediate the survey and focussing electrodes and for supplying this direct current signal to the other of the variable gain amplifier circuit means for adjusting the gain thereof so as to minimize this departure.

20. In apparatus for investigating earth formations traversed by a borehole, the combination comprising: a coil system adapted for movement through the borehole and including at least one transmitter coil and two sets of interconnected receiver coils; circuit means for supplying energizing current to the transmitter coil; first and second conductor means individually coupled to different ones of the two sets of receiver coils for providing separate indications of signals induced in the two sets of receiver coils; and a coupling transformer having one winding connected in series with the first conductor means and a second winding connected in series with the second conductor means, the mutual coupling between the transformer windings being equal in magnitude and opposite in polarity to the mutual coupling between the two sets of receiver coils, thereby to minimize signal components developed in either one of the sets of receiver coils as a result of its mutual coupling with the other set of receiver coils.

21. In apparatus for investigating earth formations traversed by a borehole, the combination comprising: a coil system adapted for movement through the borehole and including at least one transmitter coil and at least two receiver coils; circuit means for supplying energizing current to the transmitter coil; first and second conductor means individually coupled to different ones of the two receiver coils for providing separate indications of signals induced in the two receiver coils; and a coupling transformer having one winding connected in series with the first conductor means and a second winding connected in series with the second conductor means, the mutual coupling between the transformer windings being equal in magnitude and opposite in polarity to the mutual coupling between the two receiver coils, thereby to minimize signal components developed in either one of the receiver coils as a result of its mutual coupling with the other receiver coil.

22. In apparatus for investigating earth formations traversed by a borehole, the combination comprising: a coil system adapted for movement through the borehole and including at least one transmitter coil and at least two receiver coils; circuit means for supplying energizing current to the transmitter coil; first and second conductor means individually coupled to different ones of the two receiver coils for providing separate indications of signals induced in the two receiver coils; and a coupling transformer having one winding connected in series with the first conductor means and a second winding connected in series with the second conductor means, neither winding being exposed to the electromagnetic field of the transmitter coil, the mutual coupling between the transformer windings being equal in magnitude and opposite in polarity to the mutual coupling between the two receiver coils, thereby to minimize signal components developed in either one of the receiver coils as a result of its mutual coupling with the other receiver coil.

23. In apparatus for investigating earth formations traversed by a borehole, the combination comprising: a coil system adapted for movement through the borehole and including at least one transmitter coil and at least two receiver coils; circuit means for supplying energizing current to the transmitter coil; first and second phase selective circuit means for providing output signals representative of signal components of predetermined phase which are supplied to the inputs thereof; first and second conductor means individually connecting different ones of the receiver coils to the inputs of different ones of the phase selective circuit means; and mutual impedance means coupled between the first and second conductor means for minimizing signal components developed in either one of the receiver coils as a result of its mutual coupling with the other receiver coil.

24. In apparatus for investigating earth formations traversed by a borehole, the combination comprising: a coil system adapted for movement through the borehole and including at least one transmitter coil and at least two receiver coils; circuit means for supplying energizing current to the transmitter coil; first and second phase selective circuit means for providing output signals representative of signal components of predetermined phase which are supplied to the inputs thereof; first and second pairs of conductors individually connecting different ones of the receiver coils to the inputs of different ones of the phase selective circuit means; a coupling transformer having one winding connected in series with one of the conductors of the first pair and a second winding connected in series with one of the conductors of the second pair, neither winding being exposed to the electromagnetic field of the transmitter coil, the mutual coupling between the transformer windings being equal in magnitude and opposite in polarity to the mutual coupling between the two receiver coils.

25. In induction logging apparatus for investigating earth formations traversed by a borehole, the combination comprising: a coil system adapted for movement through the borehole for developing a signal representative of a property of the adjacent formation material; logarithmic circuit means for converting the coil system signal to a signal which is proportional to the logarithm thereof; means for providing an indication of the logarithmic signal; and circuit means for adjusting the signal units per decade factor of the logarithmic circuit means as a function of the magnitude of the coil system signal to compensate for undesired signal variations resulting from the occurrence of electrical skin effect phenomena in the formation material being investigated.

26. In induction logging apparatus for investigating earth formations traversed by a borehole, the combination comprising: a coil system adapted for movement through the borehole for developing a signal voltage representative of a property of the adjacent formation material; function former circuit means having a logarithmic signal transfer characteristic for converting the coil system signal voltage to a signal voltage which is proportional to the logarithm thereof; means for providing an indication of the logarithmic signal voltage and circuit means for adjusting the volts per decade factor of the function former circuit means as a function of the magnitude of the coil system signal voltage to compensate for undesired signal voltage variations resulting from the occurrence of electrical skin effect phenomena in the formation material being investigated.

27. In apparatus for investigating earth formations traversed by a borehole, the combination comprising: recording means having a movable recording element and a scale calibration which is proportional to the logarithm of a given property of the formation material with the maximum scale calibration value located at the scale extremity corresponding to the zero positon of the movable element; sensing means adapted for movement through the borehole for developing a signal which is proportional to the reciprocal of the given formation property; and circuit means coupled intermediate the sensing means and the recording means and having a logarithmic signal transfer characteristic for supplying to the recording means a signal which is proportional to the logarithm of the signal developed by the sensing means.

28. In apparatus for investigating earth formations traversed by a borehole, the combination comprising: recording means having a movable recording element and a scale calibration which is proportional to the logarithm of the electrical resistivity of the formation material with the maximum resistivity value located at the scale extremity corresponding to the zero position of the movable element; sensing means adapted for movement through the borehole for developing a signal which is proportional to the electrical conductivity of the formation material; and circuit means coupled intermediate the sensing means and the recording means and having a logarithmic signal transfer characteristic for supplying to the recording means a signal which is proportional to the logarithm of the signal developed by the sensing means.

29. In apparatus for investigating earth formations traversed by a borehole, the combination comprising: recording means having a movable recording element and a scale calibration which is proportional to the logarithm of the electrical resistivity of the formation material with the maximum resistivity value located at the scale extremity corresponding to the zero position of the movable element; a coil system adapted for movement through the borehole for developing a signal which is proportional to the electrical conductivity of the formation material; and circuit means coupled intermediate the coil system and the recording means and having a logarithmic signal transfer characteristic for supplying to the recording means a signal which is proportional to the logarithm of the signal developed by the coil system, this circuit means being coupled to the recording means with the appropriate polarity for causing deflection of the movable recording element toward the minimum resistivity value end of the scale calibration.

30. In apparatus for investigating earth formations traversed by a borehole, the combination comprising: support means adapted for movement through the borehole; a coil system and an electrode system secured to the support means for developing a pair of electrical signals representative of properties of the adjacent earth formations; circuit means for converting these signals to signals which are proportional to the logarithms thereof; and recording means for recording the logarithmic signals relating to the signals derived from the coil and electrode systems with respect to related scales having a common reference point on the same portion of a common recording medium as a function of borehole depth.

31. In apparatus for investigating earth formations traversed by a borehole, the combination comprising: support means adapted for movement through the borehole; a pair of coil systems and an electrode system secured to the support means for developing three separate electrical signals representative of properties of the adjacent earth formations; circuit means for converting these signals to signals which are proportional to the logarithms thereof; and recording means for recording the logarithmic signals on a common recording medium as a function of borehole depth.

32. A method of obtaining an improved indication of the nature of subsurface earth formations traversed by a borehole comprising: moving a plurality of exploring devices through the borehole and developing a plurality of electrical signals representative of various properties of the adjacent earth formations; individually converting these signals to signals which are proportional to the logarithms thereof; and recording the individual logarithmic signals to a common scale on the same portion of a common recording medium as a function of borehole depth whereby the separation between two recorded signals will be related to the ratio of the measurements corresponding to the same two signals.

33. In apparatus for investigating earth formations traversed by a borehole, the combination comprising: support means adapted for movement through the borehole; a plurality of exploring devices secured to the support means for developing a plurality of electrical signals representative of various properties of the adjacent earth formations; circuit means for individually converting these signals to signals which are proportional to the logarithms thereof; and recording means for recording the individual logarithmic signals relating to the signals derived from each of the exploring devices with respect to related scales having a comon reference point on the same portion of a common recording medium as a function of borehole depth.

34. In apparatus for investigating earth formations traversed by a borehole, the combination comprising: support means adapted for movement through the borehole; a plurality of exploring devices secured to the support means for developing a plurality of electrical signals representative of various properties of the adjacent earth formation; a plurality of logarithmic circuits for individually converting these signals to signals which are proportional to the logarithms thereof; a photographic recorder having a plurality of recording galvanometers individually and separately responsive to different ones of the logarithmic signals for individual recording the logarithmic signals on the same portion of a common photosensitive recording medium, such portion having one and the same scale calibration for all of these recorded signals; and means for advancing the recording medium in synchronism with the movement of the support means through the borehole.

References Cited

UNITED STATES PATENTS

| Number | Date | Name | Class |
|---|---|---|---|
| 2,600,423 | 6/1952 | Nolle | 328—145 XR |
| 3,075,142 | 1/1963 | Albright et al. | 324—1 |
| 3,120,647 | 2/1964 | Bravenec | 328—145 XR |
| 3,181,057 | 4/1965 | Bravenec | 324—6 XR |
| 2,776,402 | 1/1957 | Kokesh | 324—1 |
| 3,017,566 | 1/1962 | Schuster | 324—10 X |
| 3,034,041 | 5/1962 | Schuster | 324—1 |
| 3,103,626 | 9/1963 | Burton et al. | 324—10 X |
| 3,105,190 | 9/1963 | Norris | 324—6 |
| 3,241,102 | 3/1966 | Peterson | 346—33 |
| 3,251,029 | 5/1966 | Savage et al. | 340—18 |
| 2,369,811 | 2/1945 | Stuart | 324—132 XR |
| 3,011,582 | 12/1961 | Peterson. | |
| 3,052,835 | 9/1962 | Dunlap et al. | 324—6 XR |
| 3,062,314 | 11/1962 | Vogel et al. | |
| 3,079,550 | 2/1963 | Huddleston et al. | 324—6 XR |
| 3,102,251 | 8/1963 | Blizard | 340—18 |
| 3,259,836 | 7/1966 | Oshry | 324—6 |
| 3,329,889 | 7/1967 | Tanguy | 324—6 XR |

RUDOLPH V. ROLINEC, *Primary Examiner.*

G. R. STRECKER, *Assistant Examiner.*

U.S. Cl. X.R.

324—6, 10; 346—33